US012212843B2

United States Patent
Mahara et al.

(10) Patent No.: US 12,212,843 B2
(45) Date of Patent: Jan. 28, 2025

(54) TRANSMISSION DEVICE, RECEPTION DEVICE, AND TRANSMISSION-RECEPTION SYSTEM

(71) Applicant: SONY SEMICONDUCTOR SOLUTIONS CORPORATION, Kanagawa (JP)

(72) Inventors: Kumiko Mahara, Kanagawa (JP); Takashi Masuda, Kanagawa (JP); Ryota Shinoda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 136 days.

(21) Appl. No.: 17/999,563

(22) PCT Filed: Apr. 23, 2021

(86) PCT No.: PCT/JP2021/016501
§ 371 (c)(1),
(2) Date: Dec. 13, 2022

(87) PCT Pub. No.: WO2021/251013
PCT Pub. Date: Dec. 16, 2021

(65) Prior Publication Data
US 2023/0217102 A1 Jul. 6, 2023

(30) Foreign Application Priority Data

Jun. 10, 2020 (JP) ................. 2020-100788

(51) Int. Cl.
*H04N 23/661* (2023.01)
*H04N 7/18* (2006.01)

(52) U.S. Cl.
CPC ........... *H04N 23/661* (2023.01); *H04N 7/183* (2013.01)

(58) Field of Classification Search
CPC .... H04N 23/661; H04N 7/183; H04N 13/239; H04N 23/60; H04N 23/69; H04N 23/73;
(Continued)

(56) References Cited

U.S. PATENT DOCUMENTS

| | | | |
|---|---|---|---|
| 11,812,177 B2* | 11/2023 | Kobayashi ............. | H04N 23/73 |
| 2015/0035967 A1* | 2/2015 | Wodnicki ............... | H04N 23/66 |
| | | | 348/82 |

(Continued)

FOREIGN PATENT DOCUMENTS

| | | | |
|---|---|---|---|
| JP | 2707006 B2 | 1/1998 | |
| JP | 4512599 B2 | 7/2010 | |

(Continued)

OTHER PUBLICATIONS

International Search Report and Written Opinion of PCT Application No. PCT/JP2021/016501, issued on Jul. 13, 2021, 08 pages of ISRWO.

*Primary Examiner* — Albert H Cutler
(74) *Attorney, Agent, or Firm* — CHIP LAW GROUP

(57) ABSTRACT

An object of the present disclosure is to provide a transmission device, a reception device, and a transmission-reception system capable of achieving downsizing and communication at a high frame rate. A transmission device includes a control signal reception unit that receives a control signal input from an external device and including predetermined information, and a control unit that controls switching between first communication and second communication on a basis of switching information, the switching information being included in the predetermined information as necessary, the switching information indicating switching between the first communication in which host communication is executed in a blanking period among one frame period and the second communication in which host com- (Continued)

munication is executed in a blanking period and a data output period among one frame period.

17 Claims, 10 Drawing Sheets

(58) Field of Classification Search
CPC .... H04N 23/555; H04N 23/66; H04N 23/662; H04N 19/46; H04N 19/164; H04N 7/147; H04N 1/00095; H04N 1/00114; H04L 5/16
See application file for complete search history.

(56) References Cited

U.S. PATENT DOCUMENTS

| | | | |
|---|---|---|---|
| 2016/0232874 A1* | 8/2016 | Matsuda | G09G 5/006 |
| 2020/0195884 A1* | 6/2020 | Yoshimochi | H04N 7/0357 |

FOREIGN PATENT DOCUMENTS

| | | |
|---|---|---|
| WO | 08-102923 A | 4/1996 |
| WO | 2019/031003 A1 | 2/2019 |
| WO | 2020/070974 A1 | 4/2020 |

\* cited by examiner

US 12,212,843 B2

TRANSMISSION DEVICE, RECEPTION DEVICE, AND TRANSMISSION-RECEPTION SYSTEM

CROSS REFERENCE TO RELATED APPLICATIONS

This application is a U.S. National Phase of International Patent Application No. PCT/JP2021/016501 filed on Apr. 23, 2021, which claims priority benefit of Japanese Patent Application No. JP 2020-100788 filed in the Japan Patent Office on Jun. 10, 2020. Each of the above-referenced applications is hereby incorporated herein by reference in its entirety.

TECHNICAL FIELD

The present disclosure relates to a transmission device, a reception device, and a transmission-reception system.

BACKGROUND ART

A technique capable of performing bidirectional communication between a transmission side device and a reception side device is known (for example, Patent Documents 1 and 2). Due to a demand for downsizing of a sensor device that executes mutual communication with the reception side device, it is demanded to achieve a sensor device that shares data output and communication control from the reception side (that is, a host side) such as a bidirectional interface. Furthermore, it is also assumed that the demand for the bidirectional interface increases due to multifunctionalization of the sensor device in order to meet the demand for expansion of input-output terminals. On the other hand, however, there is an increasing demand for a sensor device to output data at a high frame rate higher than a normal frame rate.

CITATION LIST

Patent Document

Patent Document 1: Japanese Patent No. 2707006
Patent Document 2: Japanese Patent No. 4512599

SUMMARY OF THE INVENTION

Problems to be Solved by the Invention

However, a predetermined time is required for data output time of the bidirectional interface, switching time of the host, and communication time with the host, and thus there is a problem that the high frame rate cannot be achieved due to rate-limiting by these times.

An object of the present disclosure is to provide a transmission device, a reception device, and a transmission-reception system capable of achieving downsizing and communication at a high frame rate.

Solutions to Problems

In order to achieve the above object, a transmission device according to one aspect of the present disclosure includes a control signal reception unit that receives a control signal input from an external device and including predetermined information, and a control unit that controls switching between first communication and second communication on the basis of switching information, the switching information being included in the predetermined information as necessary, the switching information indicating switching between the first communication in which host communication is executed in a blanking period among one frame period and the second communication in which host communication is executed in a blanking period and a data output period among one frame period.

Furthermore, in order to achieve the above object, a reception device according to one aspect of the present disclosure includes a control signal transmission unit that transmits, to an external device, a control signal including predetermined information including switching information as necessary, the switching information indicating switching between the first communication in which host communication is executed in a blanking period among one frame period and the second communication in which host communication is executed in a blanking period and a data output period among one frame period, and a control unit that controls transmission of the control signal to the control signal transmission unit.

Furthermore, in order to achieve the above object, a transmission-reception system according to one aspect of the present disclosure includes a transmission device that transmits a predetermined signal, and a reception device that receives the predetermined signal transmitted from the transmission device, in which the transmission device includes a control signal reception unit that receives a control signal input from the reception device and including predetermined information, and a control unit that controls switching between first communication and second communication on the basis of switching information, the switching information being included in the predetermined information as necessary, the switching information indicating switching between the first communication in which host communication is executed in a blanking period among one frame period and the second communication in which host communication is executed in a blanking period and a data output period among one frame period, and the reception device includes a control signal transmission unit that transmits, to the transmission device, a control signal included in the predetermined information in which the switching information is included as necessary, and a control unit that controls transmission of the control signal to the control signal transmission unit.

MODE FOR CARRYING OUT THE INVENTION

First Embodiment

A transmission device, a reception device, and a transmission-reception system according to a first embodiment of the present disclosure will be described with reference to FIGS. 1 to 7. First, a schematic configuration of a transmission device, a reception device, and a transmission-reception system according to the present embodiment will be described with reference to FIG. 1. The transmission device, the reception device, and the transmission-reception system according to the present embodiment transmit and receive data for transmission, a clock signal for synchronization, and a control signal for controlling operation of the transmission device by a clock embedded method.

Figure 1:
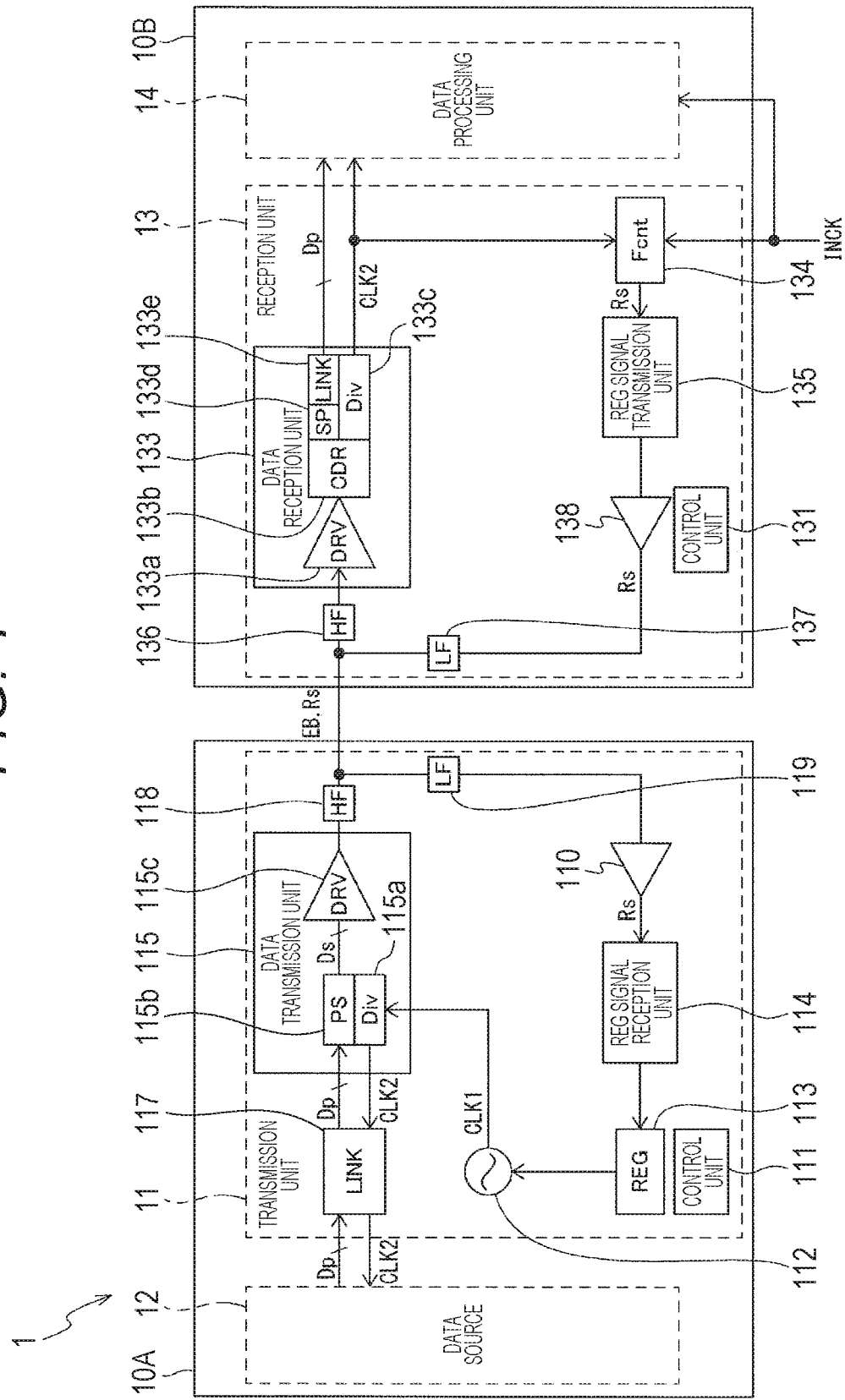
FIG. 1 is a functional block diagram depicting a schematic configuration of a transmission device, a reception device, and a transmission-reception system according to a first embodiment of the present disclosure.

As depicted in FIG. 1, a transmission-reception system 1 according to the present embodiment includes a transmission device 10A that transmits a predetermined signal and a reception device 10B that receives the predetermined signal transmitted from the transmission device 10A. The transmission-reception system 1 can be applied to, for example, an endoscope system, and the transmission device 10A transmits imaging data imaged by the transmission device 10A to the reception device 10B. The reception device 10B processes the imaging data transmitted from the transmission device 10A and transmits the processed imaging data to, for example, a display apparatus (not depicted). Accordingly, the transmission device 10A is downsized so as to be capable of entering a narrow area such as the inside of a human body. Furthermore, the reception device 10B has a configuration capable of receiving the imaging data from the downsized transmission device 10A and controlling a clock signal in order to stably operate the transmission device 10A.

The transmission device 10A is configured to bidirectionally communicate a signal (data Ds for transmission, first clock signal CLK1 for synchronization, and register signal Rs for controlling operation of the transmission device 10A) with the reception device 10B according to the Scalable Low Voltage Signaling with Embedded Clock (SLVS-EC) standard. In other words, the reception device 10B is configured to bidirectionally communicate the signal (data Ds for transmission, first clock signal CLK1 for synchronization, and register signal Rs for controlling operation of the transmission device 10A) with the transmission device 10A according to the SLVS-EC standard. Moreover, in other words, the transmission-reception system 1 is configured to bidirectionally communicate the signal (data Ds for transmission, first clock signal CLK1 for synchronization, and register signal Rs for controlling operation of the transmission device 10A) according to the SLVS-EC standard between the transmission device 10A and the reception device 10B.

The transmission device 10A according to the present embodiment includes a data source (an example of a data generation unit) 12 that generates data that is one of predetermined signals to be transmitted to the reception device 10B, and a transmission unit 11 that transmits data input from the data source 12 to an oscillator 112. In the present embodiment, the transmission unit 11 and the data source 12 are formed on different semiconductor chips and stacked. Note that the transmission unit 11 and the data source 12 may be formed in the same semiconductor chip.

The data source 12 has, for example, a solid-state image pickup element (not depicted). The data source 12 is configured to output, to the transmission unit 11, imaging data obtained by imaging an external environment in which the transmission device 10A is disposed.

As depicted in FIG. 1, the transmission unit 11 included in the transmission device 10A includes an oscillator 112 that oscillates a first clock signal CLK1, and a register signal reception unit (an example of the control signal reception unit) 114 that receives a register signal (an example of the control signal) Rs transmitted from the reception device 10B and controlled by the first clock signal CLK1. The reception device 10B corresponds to an example of an external device in the transmission device 10A. Note that, in FIG. 1 and other drawings, a register is denoted as "REG".

The oscillator 112 is configured to be capable of changing an oscillation frequency. Thus, the oscillator 112 can output the first clock signal CLK1 whose frequency has been changed. Unlike a phase locked loop (PLL), the oscillator 112 does not have a phase comparator, a loop filter, a voltage controlled oscillator, a frequency divider, and the like. Thus, the transmission device 10A can be downsized as compared with a conventional transmission device having a PLL.

The transmission unit 11 includes a register 113 that stores a set value of the frequency of the first clock signal CLK1 oscillated by the oscillator 112, and the like. The register 113 stores a plurality of set values associated with each frequency of the first clock signal CLK1. The register 113 reads the same set value as a set value included in the register signal Rs received by the register signal reception unit 114 and outputs the read set value to the oscillator 112. The oscillator 112 sets the set value input from the register 113 to a predetermined region. Thus, the oscillator 112 oscillates the first clock signal CLK1 having a frequency corresponding to the set value input from the register 113.

The register 113 is configured to store a frame rate at which the data source 12 images the external environment. Furthermore, the register 113 is configured to store the number of frames to be imaged at a high frame rate higher than a normal frame rate (that is, the number of times of imaging). A numerical value of the high frame rate stored in the register 113 and the number of frames imaged at the high frame rate are included in, for example, the register signal Rs and transmitted from the reception device 10B to the transmission device 10A. Moreover, the register 113 may store not only the set value, the number of frames, and the like of the first clock signal CLK1 but also a set value of each component provided in the transmission device 10A.

Upon receiving the register signal Rs transmitted from the reception device 10B, the register signal reception unit 114 acquires frequency level information included in the received register signal Rs. The frequency level information is information indicating that the frequency of the first clock signal CLK1 is an optimum value, or information indicating whether the frequency of the first clock signal CLK1 is higher or lower than a frequency of a reference clock signal INCK. A frequency difference between the first clock signal CLK1 and the reference clock signal INCK is detected by the reception device 10B. In a case of acquiring the frequency level information indicating that the frequency of the first clock signal CLK1 is higher than the frequency of the reference clock signal INCK, the register signal reception unit 114 outputs a set value for lowering the current frequency of the first clock signal CLK1 to the register 113. On the other hand, in a case of acquiring the frequency level information indicating that the frequency of the first clock signal CLK1 is lower than the frequency of the reference clock signal INCK, the register signal reception unit 114 outputs a set value for increasing the current frequency of the first clock signal CLK1 to the register 113.

The register signal reception unit 114 may receive the register signal Rs input from the reception device 10B and including predetermined information. The predetermined information included in the register signal Rs includes, for example, information such as a value of one frame period at the normal frame rate, a value of one frame period having a high frame rate higher than the normal frame rate, and the number of consecutive times of frames executed at the high frame rate, as necessary. Furthermore, the predetermined information included in the register signal Rs includes, as necessary, switching information indicating switching between the first communication in which host communication is executed in a blanking period among one frame period and the second communication in which host communication is executed in a blanking period and a data output period among one frame period, for example. The switching information includes, for example, timing of switching from the first communication to the second communication, timing of switching from the second communication to the first communication, start timing and end timing of the host communication in the first communication, start timing and end timing of the host communication in the second communication, and the like. The register signal reception unit 114 stores the received predetermined information in the register 113.

The transmission unit 11 includes a data transmission unit 115 that transmits data input from the data source 12 to the reception device 10B. The data transmission unit 115 includes a frequency divider 115a that frequency-divides the first clock signal CLK1 input from the oscillator 112 to generate a second clock signal CLK2 having a frequency lower than that of the first clock signal CLK1. Note that, in FIG. 1 and other drawings, the frequency divider is denoted as "Div". The frequency divider 115a outputs the second clock signal CLK2 to the data source 12 via a link unit 117 (details will be described later).

Furthermore, the data transmission unit 115 includes a parallel-serial conversion unit 115b that converts data Dp input in a parallel format from the data source 12 in synchronization with the second clock signal CLK2 into data Ds in a serial format synchronized with the first clock signal CLK1. Note that, in FIG. 1 and other drawings, the parallel-serial conversion unit is denoted as "PS". Moreover, the data transmission unit 115 includes a driver 115c that embeds the first clock signal CLK1 in the data Ds in a serial format synchronized with the first clock signal CLK1, and transmits a clock embedded signal EB to the reception device 10B. Note that, in FIG. 1 and other drawings, the driver is denoted as "DRV". The driver 115c converts the first clock signal CLK1 of single-ended method and the data Ds of single-ended method into signals of differential method, and embeds the first clock signal CLK1 in the data Ds to generate the clock embedded signal EB. In this case, although the number of pins (the number of terminals) used for input/output and the like increases as compared with a case of transmitting the clock embedded signal EB of the single-ended method, the transmission unit 11 can transmit the clock embedded signal EB to the reception device 10B at a low voltage. Furthermore, the transmission device 10A can transmit the data Ds and the first clock signal CLK1 synchronized with each other to the reception device 10B as compared with the case where the data Ds and the first clock signal CLK1 are transmitted by a source synchronous method. Moreover, in a case where the transmission device 10A transmits the data Ds and the first clock signal CLK1 by the clock embedded method, wiring for transmitting the first clock signal CLK1 becomes unnecessary, as compared with the source synchronous method. Thus, in the transmission-reception system 1, the number of wirings between the transmission device 10A and the reception device 10B can be reduced.

Furthermore, in a case where the driver 115c has a voltage follower configuration, for example, the driver 115c can perform input-output impedance conversion. Thus, the output impedance of the driver 115c decreases, and thus the output current can be improved. Therefore, the transmission device 10A can prevent a malfunction due to a decrease (that is, the signal waveform of the clock embedded signal EB is blunted) in the signal level of the clock embedded signal EB output from the driver 115c in the wiring connecting the transmission device 10A and the reception device 10B.

The transmission unit 11 includes a link unit 117 provided between the data source 12 and the data transmission unit 115. The link unit 117 outputs the second clock signal CLK2 input from the data transmission unit 115 to the data source 12. Furthermore, the link unit 117 performs predetermined processing on data input from the data source 12 in synchronization with the second clock signal CLK2, and outputs data Dp in a parallel format to the data transmission unit 115 in synchronization with the second clock signal CLK2.

The link unit 117 exhibits a function of converting the bit depth of the data Dp input from the data source 12. As an example of the clock embedded method, 8B10B coding of embedding a clock signal in an 8-bit signal is known. For example, the link unit 117 may be configured to be capable of converting 8-bit data Dp into 10-bit data Dp so that the 8B10B coding can be used in the present embodiment. Furthermore, in the present embodiment, coding such as 64B66B, 128b130b, or 128b132b other than the 8B10B coding, or a clock embedded method of another method may be used as coding for embedding a clock signal in data. In these cases, by having a configuration applicable to the clock embedded method in which the link unit 117 is used, transmission and reception of data can be achieved between the transmission device 10A and the reception device 10B.

The transmission device 10A includes reproduction units 118 and 119 that reproduce the clock embedded signal EB and the register signal Rs transmitted and received by the common wiring. The reproduction unit 118 is connected between a common wiring (hereinafter referred to as "common wiring") through which the clock embedded signal EB and the register signal Rs are transmitted and received and an output terminal of the data transmission unit 115. The reproduction unit 119 is connected between the common wiring and an input terminal of the register signal reception unit 114.

The reproduction unit 118 includes, for example, a high-pass filter. The reproduction unit 118 can pass the high-frequency clock embedded signal EB output from the data transmission unit 115 and block the low-frequency register signal Rs transmitted by the common wiring. Thus, the transmission device 10A can transmit the clock embedded signal EB from the data transmission unit 115 to the reception device 10B, and can prevent the register signal Rs transmitted from the reception device 10B from affecting the data transmission unit 115.

The reproduction unit 119 includes, for example, a low-pass filter. The reproduction unit 119 can block the high-frequency clock embedded signal EB output from the data transmission unit 115 and pass the low-frequency register signal Rs transmitted by the common wiring. Thus, the transmission device 10A can prevent the clock embedded signal EB output from the data transmission unit 115 from being input to the register signal reception unit 114, and can input the register signal Rs transmitted from the reception device 10B to the register signal reception unit 114.

The transmission device 10A includes a buffer unit 110 between the reproduction unit 119 and the register signal reception unit 114. An input terminal of the buffer unit 110 is connected to an output terminal of the reproduction unit 119, and an output terminal of the buffer unit 110 is connected to an input terminal of the register signal reception unit 114. Thus, the buffer unit 110 can output the register signal Rs output from the reproduction unit 119 to the register signal reception unit 114. The buffer unit 110 includes, for example, a voltage follower circuit. Thus, the buffer unit 110 can prevent a decrease in the voltage level of the register signal Rs output from the reproduction unit 119 due to impedance conversion.

The transmission unit 11 includes a control unit 111. The control unit 111 integrally controls the oscillator 112, the register 113, the register signal reception unit 114, the data transmission unit 115, a clock signal transmission unit 116, and the link unit 117. Note that the control unit 111 may also be configured to control the data source 12.

Moreover, the control unit 111 is configured to perform control on the basis of switching information included in the predetermined information as necessary, the switching information indicating switching between the first communication in which host communication is executed in a blanking period among one frame period and the second communication in which host communication is executed in a blanking period and a data output period among one frame period. That is, the control unit 111 is configured to switch from the first communication to the second communication in a case where the one frame period has a high frame rate higher than the normal frame rate of a predetermined period. That is, the control unit 111 executes the host communication in the blanking period among one frame period in a case of the normal frame rate, and executes the host communication in the blanking period and the data output period among one frame period in a case of the high frame rate.

Furthermore, the control unit 111 is configured to analyze the register signal Rs received by the register signal reception unit 114 and acquire information included in the register signal Rs. The control unit 111 controls transmission of the first information to the reception device 10B when switching from the first communication to the second communication. Furthermore, the control unit 111 controls transmission of second information to the reception device 10B when switching from the second communication to the first communication. Here, for example, the first information is standby sequential information (details will be described later), and the second information is training sequential information (details will be described later).

Therefore, after transmitting the second information to the reception device 10B and before transmitting the first information to the reception device 10B, the control unit 111 executes the host communication in the blanking period. Furthermore, after transmitting the first information to the reception device 10B and until transmitting the second information to the reception device 10B, the control unit 111 executes the host communication in the blanking period and the data output period (that is, one frame period). As described above, by switching the period during which the host communication is executed according to the frame rate, the transmission device 10A can transmit and receive data to and from the reception device 10B at the set frame rate without being limited by the host communication even at the high frame rate.

The reception device 10B according to the present embodiment includes a reception unit 13 that receives a predetermined signal transmitted from the transmission device 10A, and a data processing unit 14 that performs predetermined processing on data received by the reception unit 13. In the present embodiment, the reception unit 13 and the data processing unit 14 are formed on different semiconductor chips and stacked. Note that the reception unit 13 and the data processing unit 14 may be formed in the same semiconductor chip.

As depicted in FIG. 1, the reception unit 13 included in the reception device 10B includes a data reception unit 133 that receives the clock embedded signal EB transmitted from the transmission device 10A and output from a reproduction unit 136 (details will be described later). The transmission device 10A corresponds to an example of the external device in the reception device 10B.

The data reception unit 133 includes a driver 133a to which the clock embedded signal EB transmitted from the driver 115c provided in the data transmission unit 115 of the transmission device 10A and output from the reproduction unit 136 is input. The driver 133a is configured to convert the data Ds of the differential method input from the reproduction unit 136 into the data Ds of single-ended method and amplify the converted data Ds.

The data reception unit 133 includes a reproduction unit 133b that reproduces the first clock signal CLK1 from the data Ds input from the driver 133a. The reproduction unit 133b exerts a clock data recovery (CDR) function, for example. Note that, in FIG. 1 and other drawings, a reproduction unit that exhibits a CDR function is denoted as "CDR".

The data reception unit 133 includes a frequency divider 133c that divides the frequency of the first clock signal CLK1 input from the reproduction unit 136 to generate the second clock signal CLK2 having a frequency lower than that of the first clock signal CLK. The frequency divider 133c has the same configuration as the frequency divider 115a provided in the data transmission unit 115 of the transmission device 10A. The frequency divider 133c frequency-divides the first clock signal CLK1 and generates the second clock signal CLK2 having the same frequency as the second clock signal CLK2 generated by the frequency divider 115a.

The data reception unit 133 includes a serial-parallel conversion unit 133d that converts the data Ds input in a serial format from the driver 133a into data Dp in a parallel format synchronized with the second clock signal CLK2. Note that, in FIG. 1 and other drawings, the serial-parallel conversion unit is denoted as "SP".

The data reception unit 133 includes a link unit 133e to which the data Dp in the parallel format output from the serial-parallel conversion unit 133d is input. The link unit 133e converts the data Dp output from the serial-parallel conversion unit 133d into a data format that can be processed by the data processing unit 14 (details will be described later). Moreover, the link unit 133e changes the bit depth of the data Dp converted into the parallel format by the serial-parallel conversion unit 133d. For example, the link unit 133e may be configured to convert the bit depth of the data Dp input from the serial-parallel conversion unit 133d into the same bit depth as that of the data Dp output from the data source 12. Furthermore, for example, the link unit 133e may be configured to convert the bit depth of the data Dp input from the serial-parallel conversion unit 133d into a bit depth different from the bit depth of the data Dp output from the data source 12.

As described above, the data reception unit 133 can output the second clock signal CLK2 generated by dividing the first clock signal CLK1 and the data Dp in the parallel format in synchronization with the second clock signal CLK2 to the data processing unit 14. Moreover, the data reception unit 133 can output the second clock signal CLK2 to a signal generation unit 134.

The data Dp output from the data reception unit 133 is a signal synchronized with the second clock signal CLK2 generated by the frequency divider 133c. Furthermore, the data Dp input to the data transmission unit 115 is a signal synchronized with the second clock signal CLK2 generated by the frequency divider 115a. However, the second clock signal CLK2 generated by the frequency divider 115a of the data transmission unit 115 and the second clock signal CLK2 generated by the frequency divider 133c of the data reception unit 133 have different phases and do not have exactly the same timing. In the present embodiment, the second clock signal CLK2 generated by the frequency divider 115a and the second clock signal CLK2 generated by the frequency divider 133c are signals of the same frequency, but may be signals of different frequencies. For example, it is assumed that the data transmission unit 115 of the transmission unit 11 is configured to convert the data Dp input at a communication speed of 50 Mbps/20 bits (the frequency of the second clock signal CLK2 generated by the frequency divider 115a is 50 MHz) into the data Ds at a communication speed of 1 Gbps/1 bit. In this case, the data reception unit 133 of the reception unit 13 may be configured to convert the data Ds input at a communication speed of 1 Gbps/1 bit into the data Dp at a communication speed of 100 Mbps/10 bits (the frequency of the second clock signal CLK2 generated by the frequency divider 133c is 10 MHz).

The reception unit 13 includes a signal generation unit 134 that generates a register signal (an example of the control signal) Rs for controlling the first clock signal CLK1 on the basis of a comparison result obtained by comparing one of the first clock signal CLK1 transmitted from the transmission device 10A and the second clock signal CLK2 based on the first clock signal CLK1 with the reference clock signal INCK. Here, since the second clock signal CLK2 is a signal generated by dividing the frequency of the first clock signal CLK1, the second clock signal CLK2 corresponds to the signal based on the first clock signal CLK1. Note that, in FIG. 1 and other drawings, the signal generation unit is denoted as "Fcnt". Furthermore, the reception unit 13 includes a register signal transmission unit (an example of a control signal transmission unit) 135 that transmits the register signal Rs generated by the signal generation unit 134 to the transmission device 10A. The register signal transmission unit 135 has an input terminal connected to an output terminal of the signal generation unit 134.

The second clock signal CLK2 output from the frequency divider 133c and the reference clock signal INCK input from the outside of the reception device 10B are input to the signal generation unit 134. The signal generation unit 134 continues to sequentially compare the frequencies of the input second clock signal CLK2 and reference clock signal INCK. The signal generation unit 134 includes, for example, a counter that operates on the second clock signal CLK2 and a counter that operates on the reference clock signal INCK. The signal generation unit 134 compares count values counted by the respective counters within a predetermined period, and acquires a frequency difference between the second clock signal CLK2 and the reference clock signal INCK. The signal generation unit 134 outputs the register signal Rs to the register signal transmission unit 135 when the frequency difference between the second clock signal CLK2 and the reference clock signal INCK falls outside a predetermined error range. The register signal Rs includes frequency level information.

The register signal transmission unit 135 is configured to transmit, to the transmission device (an example of the external device) 10A, a register signal (an example of the control signal) Rs including predetermined information that includes, as necessary, switching information indicating switching between the first communication in which host communication is executed in a blanking period among one frame period and the second communication in which host communication is executed in a blanking period and a data output period among one frame period. Further, in a case where it is determined that the first information has been transmitted from the transmission device 10A, the register signal transmission unit 135 is configured to transmit the register signal Rs to the transmission device 10A as necessary. Furthermore, in a case where it is determined that the second information has been transmitted from the transmission device 10A, the register signal transmission unit 135 is configured to end the transmission of the register signal Rs to the transmission device 10A. Here, the first information is the standby sequential information, and the second information is the training sequential information. The first information and the second information are included in, for example, the clock embedded signal EB and transmitted from the transmission device 10A to the reception device 10B. Furthermore, a control unit 131 determines whether or not the first information or the second information is transmitted from the transmission device 10A.

The reception device 10B includes reproduction units 136 and 137 that reproduce the clock embedded signal EB and the register signal Rs transmitted and received by the common wiring. The reproduction unit 136 is connected between the common wiring and an input terminal of the data reception unit 133. The reproduction unit 137 is connected between the common wiring and an output terminal of the register signal transmission unit 135.

The reproduction unit 136 includes, for example, a high-pass filter. Thus, the reproduction unit 136 can pass the high-frequency clock embedded signal EB transmitted from the transmission device 10A and block the low-frequency register signal Rs output from the register signal transmission unit 135. Therefore, the reception device 10B can receive the clock embedded signal EB transmitted from the data transmission unit 115 via the reproduction unit 118, and can prevent the register signal Rs output from the register signal transmission unit 135 from being input to the data reception unit 233.

The reproduction unit 137 includes, for example, a low-pass filter. Thus, the reproduction unit 137 can block the high-frequency clock embedded signal EB transmitted from the transmission device 10A and pass the low-frequency register signal Rs output from the register signal transmission unit 135. Therefore, the reception device 10B can prevent the clock embedded signal EB transmitted from the transmission device 10A from affecting the register signal transmission unit 135, and can transmit the register signal Rs output from the register signal transmission unit 135 to the transmission device 10A via the common wiring.

The reception device 10B includes a buffer unit 138 between the register signal transmission unit 135 and the reproduction unit 137. An input terminal of the buffer unit 138 is connected to the output terminal of the register signal transmission unit 135, and an output terminal of the buffer unit 138 is connected to an input terminal of the reproduction unit 137. Thus, the buffer unit 138 can output the register signal Rs output from the register signal transmission unit 135 to the reproduction unit 137. The buffer unit 138 includes, for example, a voltage follower circuit. Thus, the buffer unit 138 can prevent a decrease in the voltage level of the register signal Rs output from the register signal transmission unit 135 by performing impedance conversion.

The transmission device 10A, the reception device 10B, and the transmission-reception system 1 use a full-duplex system for simultaneously transmitting and receiving the register signal Rs and the clock embedded signal EB as bidirectional communication. The transmission device 10A includes the reproduction units 118 and 119, and the reception device 10B includes the reproduction units 136 and 137. Thus, the transmission device 10A, the reception device 10B, and the transmission-reception system 1 can easily reproduce the register signal Rs and the clock embedded signal EB even when the full-duplex system is used.

Furthermore, the transmission device 10A, the reception device 10B, and the transmission-reception system 1 may use a half-duplex system that temporally divides and transmits the register signal Rs and the clock embedded signal EB as bidirectional communication. In the half-duplex system, in a case where the data signal acquired by the data source 12 is, for example, image data, the register signal Rs and the clock embedded signal EB can be temporally reproduced by transmitting the register signal Rs in a certain period of the blanking period, for example. For example, the register signal Rs having a low communication speed may be transmitted in a vertical blanking period. Furthermore, since the data Ds has a higher communication speed than the register signal Rs, the data Ds may be transmitted in at least one of the vertical blanking period or other predetermined periods. Thus, the system efficiency for transmitting the register signal Rs and the clock embedded signal EB can be improved. Furthermore, in the half-duplex system, since it is not necessary to provide the reproduction units 118, 119, 136, and 137, it is possible to downsize and simplify the transmission device 10A and the reception device 10B.

The reception unit 13 includes a control unit 131. The control unit 131 integrally controls the data reception unit 133, the signal generation unit 134, and the register signal transmission unit 135.

Furthermore, the control unit 131 is configured to control the transmission of the register signal Rs from the register signal transmission unit 135. In a case of setting a new value of the normal frame rate or the high frame rate in order to change the normal frame rate or the high frame rate, or the like, the control unit 131 controls the register signal transmission unit 135 to include these pieces of information in the register signal Rs. Examples of the case where a new value such as a frame rate is set to the register signal Rs include setting by the user using the transmission-reception system 1, and determination based on image data. Examples of the setting by the user include a case where there are an object desired to be imaged in slow motion and an object desired to be imaged at a high frame rate. Furthermore, examples of the determination based on image data include a case where it is detected that a moving object has entered a specific region. The register signal transmission unit 135 outputs the register signal Rs including information such as a new normal frame rate to the transmission device 10A in the host communication.

The data processing unit 14 provided in the reception device 10B executes predetermined processing using the data Dp input from the data reception unit 133, the second clock signal CLK2, and the reference clock signal INCK input from the outside of the reception device 10B. For example, the data processing unit 14 executes rearrangement processing, correction processing, and the like of the data Dp in order to display an image captured by the data source 12 on a display apparatus (not depicted).

(Operations of Transmission Device, Reception Device, and Transmission-Reception System)

Figure 2:
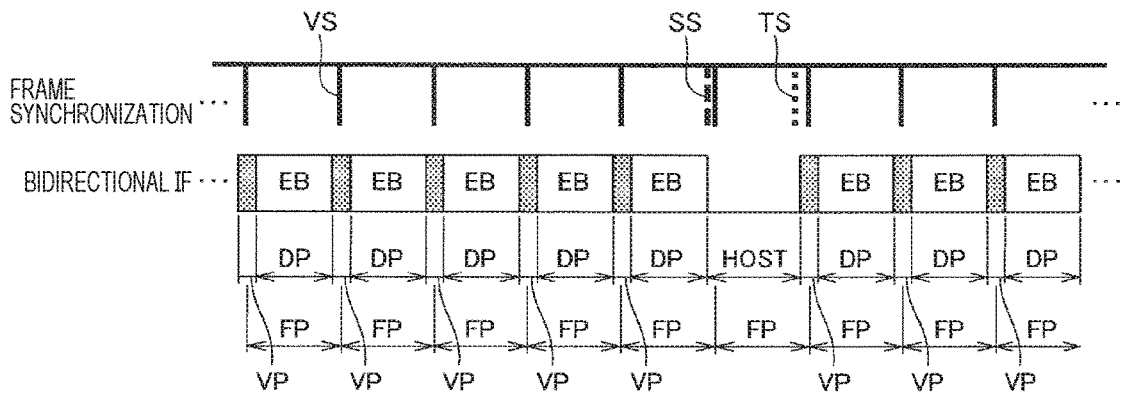
FIG. 2 is a diagram depicting an example of a timing chart of the transmission device, the reception device, and the transmission-reception system according to the first embodiment of the present disclosure.
Figure 3:
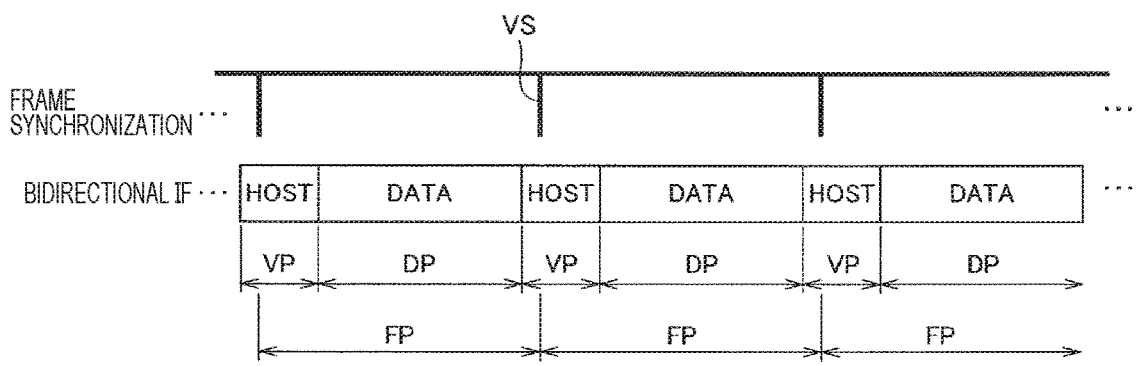
FIG. 3 is a diagram depicting an example of a timing chart of a transmission device, a reception device, and a transmission-reception system as a comparative example.
Figure 4:
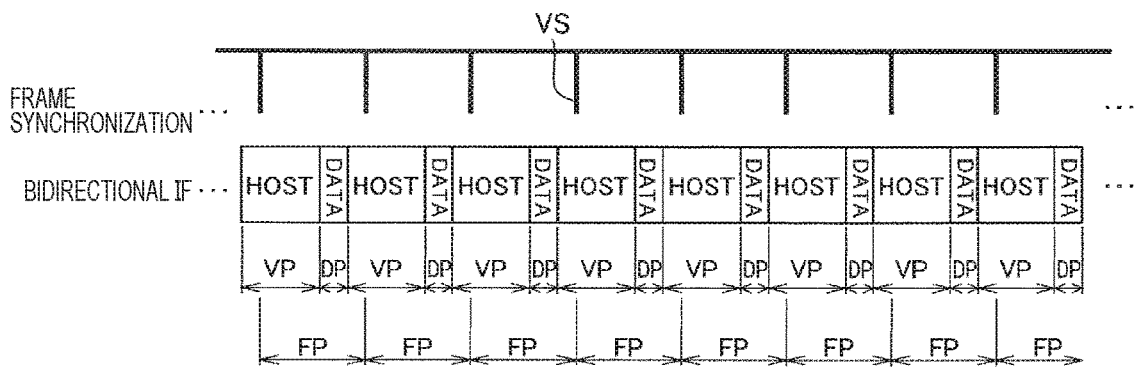
FIG. 4 is a diagram depicting another example of a timing chart of the transmission device, the reception device, and the transmission-reception system as the comparative example.

Operations of the transmission device 10A, the reception device 10B, and the transmission-reception system 1 according to the present embodiment will be described with reference to FIGS. 2 to 5 while referring to FIG. 1. First, the operation of the transmission device 10A according to the present embodiment will be described with reference to FIGS. 2 to 4. "Frame synchronization" depicted in FIGS. 2 to 4 represents an output timing of a frame synchronization signal. "Bidirectional IF" in FIGS. 2 to 4 indicates a transmission state of data from the transmission device 10A to the reception device 10B.

As depicted in FIG. 2, a frame period FP is a period obtained by combining a blanking period VP and a data output period DP. One frame is configured in the order of "blanking period BP→data output period DP→blanking period BP" in synchronization with a frame synchronization signal VS.

Although depiction is omitted, the transmission device 10A transmits the standby sequential information to the reception device 10B at the start of the blanking period VP, for example, in each frame at the normal frame rate. Furthermore, the transmission device 10A transmits the training sequential information to the reception device 10B before the end of the blanking period VP, for example, in each frame at the normal frame rate. Thus, in the transmission-reception system 1, the host communication is executed in the blanking period VP at the normal frame rate.

As depicted in FIG. 2, until the transmission device 10A transmits the standby sequential information to the reception device 10B at the high frame rate, the transmission device 10A outputs the clock embedded signal EB (see FIG. 1) to the reception device 10B in the data output period DP, thereby transmitting the data Ds acquired by the data source 12 (see FIG. 1) to the reception device 10B. Furthermore, the transmission device 10A transmits the standby sequential information SS as the first information to the reception device 10B immediately before the frame synchronization signal VS, for example, at the high frame rate. Thus, the transmission-reception system 1 executes the host communication in the subsequent blanking period BP and data output period DP (that is, frame period FP). The transmission device 10A does not transmit the clock embedded signal EB to the reception device 10B during the period in which the host communication is executed.

As depicted in FIG. 2, the transmission device 10A continuously executes the host communication until, for example, the training sequential information TS is transmitted to the reception device 10B as the second information after starting the host communication. Furthermore, the transmission device 10A transmits the training sequential information TS as the second information to the reception device 10B immediately before, for example, the frame synchronization signal VS at the high frame rate. Thus, the transmission-reception system 1 ends the host communication and transmits the clock embedded signal EB to the reception device 10B in the subsequent data output period DP. FIG. 2 depicts an example in which the host communication is executed in one frame, but the present invention is not limited thereto, and the host communication may be continued for two or more frames.

Here, as a comparative example, the host communication in a conventional transmission device will be described with reference to FIGS. 3 and 4. In a case of the frame period FP at the normal frame rate (for example, 60 [fps]), the blanking period VP also becomes long. Thus, as depicted in FIG. 3, the conventional transmission device can secure the time for executing the host communication in the blanking period VP.

On the other hand, in a case of a high frame rate (for example, 1000 [fps]) that is a higher frame rate than usual, the blanking period VP and the data output period DP are reduced. As depicted in FIG. 4, in a case of a high frame rate, the conventional transmission device reduces a data transmission period by data compression or the like and increases the blanking period VP to secure a time for executing the host communication. However, there is a limit to reduction of the data transmission period. Moreover, a predetermined time is required to execute the host communication. Thus, the conventional transmission device that executes bidirectional communication with the reception device cannot perform bidirectional communication at a high frame rate required from the reception device due to being limited by the host communication, and has a problem of decreasing the frame rate.

On the other hand, the transmission device 10A according to the present embodiment is configured to use at least one frame period FP for the host communication. Furthermore, the transmission device 10A can use two or more frame periods FP for the host communication depending on the value of the frame rate. Thus, the transmission device 10A can execute the host communication even at a high frame rate with a short frame period FP. As described above, the transmission device 10A, the reception device 10B, and the transmission-reception system 1 can execute bidirectional communication at a high frame rate without being limited by the host communication.

Next, an operation of the transmission-reception system 1 according to the present embodiment will be described with reference to FIG. 5. The frame format in the present embodiment is depicted on the left side in FIG. 5, and the operation sequence of the transmission-reception system 1 is depicted on the right side in FIG. 5.

Figure 5:
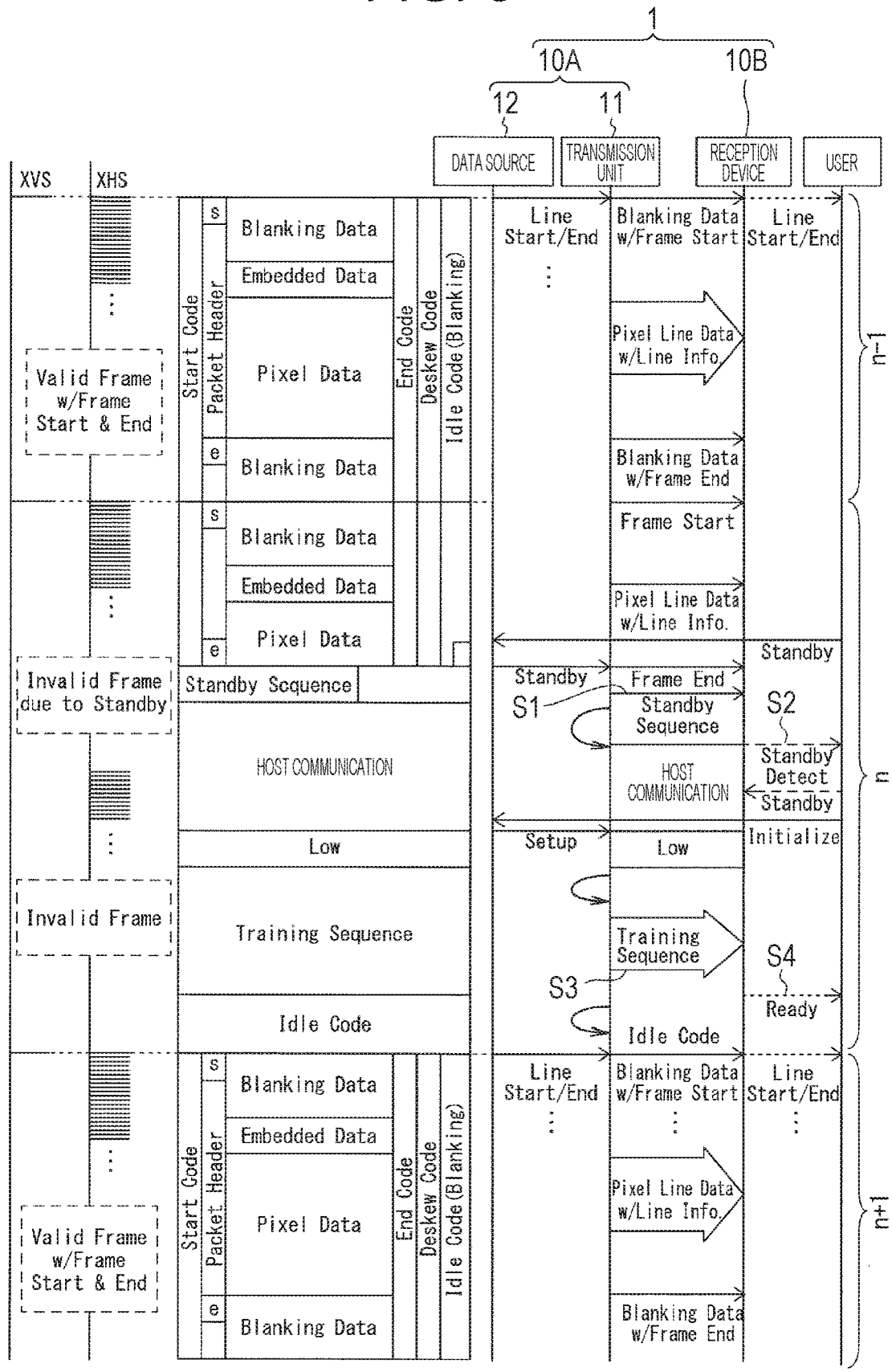
FIG. 5 is an example of a sequence diagram of bidirectional communication in the transmission device, the reception device, and the transmission-reception system according to the first embodiment of the present disclosure.

As depicted in FIG. 5, a frame format of one frame includes blanking data, embedded data, pixel data, and blanking data. Hereinafter, blanking data before embedded data in one frame period may be referred to as "first half blanking data", and blanking data after pixel data in the one frame period may be referred to as "second half blanking data". As indicated by an (n−1)th frame, the transmission device 10A transmits, to the reception device 10B, a clock embedded signal EB in which the first clock signal CLK1 is embedded in data Ds in which the blanking data, the embedded data, the pixel data, and the blanking data are arranged in this order.

As depicted in the sequence diagram in FIG. 5, when switching from the normal frame rate to the high frame rate, the transmission device 10A transmits the standby sequential information to the reception device 10B as information of start of execution of a standby sequence (step S1), and starts the host communication. The transmission device 10A switches from the normal frame rate to the high frame rate or transmits the standby sequential information to the reception device 10B on the basis of the information set in the register 113 (see FIG. 1).

As depicted on the right side in FIG. 5, when receiving the information of the start of execution of the standby sequence, the reception device 10B outputs a standby detection signal indicating that the information has been received to a predetermined device operated by the user (step S2).

When the control unit 111 included in the transmission device 10A determines that it is the end timing of the host communication on the basis of the information set in the register 113, the control unit 111 transmits the standby sequential information to the reception device 10B as depicted in the sequence diagram in FIG. 5 (step S3), and then shifts to the idle mode. In this manner, the transmission device 10A, the reception device 10B, and the transmission-reception system 1 are switched from a state in which the second communication can be executed to a state in which the first communication can be executed.

As depicted in the sequence diagram in FIG. 5, in the reception device 10B, when the training sequential information is received, the control unit 131 (see FIG. 1) controls the data reception unit 133 (see FIG. 1) and the like to control the reception device 10B to be in a state where data can be received. When being controlled to be capable of receiving data, the reception device 10B outputs a ready signal to the predetermined device operated by the user (step S4). Thus, the user can determine that the transmission device 10A transmits data and the reception device 10B is set to a state capable of receiving data.

As depicted in the sequence diagram in FIG. 5, when the (n+1)th frame is started, the transmission device 10A transmits the clock embedded signal EB to the reception device 10B by an operation based on the parameter set in the nth frame.

(Modification 1)

A transmission device, a reception device, and a transmission-reception system according to Modification 1 of the present embodiment will be described with reference to FIG.

Figure 6:
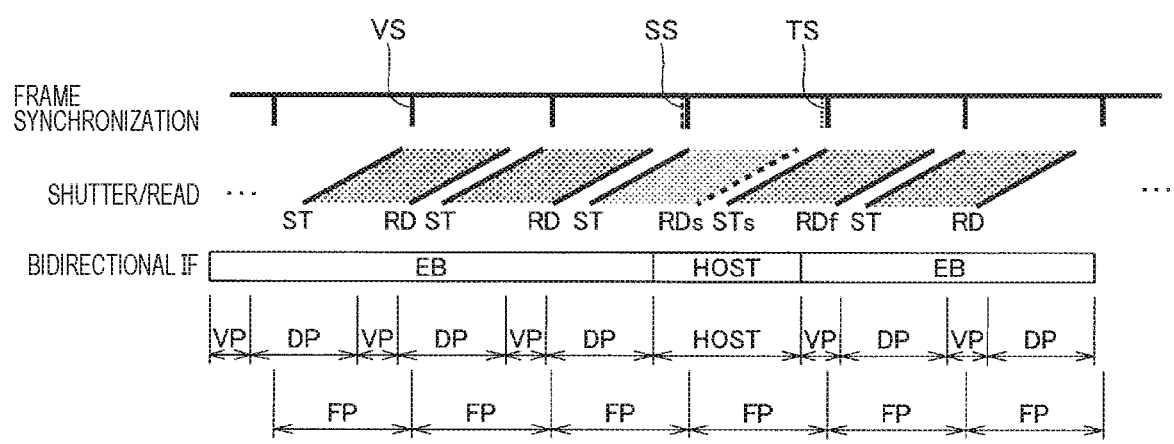
FIG. 6 is a diagram depicting an example of a timing chart of a transmission device, a reception device, and a transmission-reception system according to Modification 1 of the first embodiment of the present disclosure.

6. The transmission device 10A, the reception device 10B, and the transmission-reception system 1 according to the present modification are characterized in that the data source 12 includes, for example, a solid-state image pickup element of rolling shutter method. "Frame synchronization" depicted in FIG. 6 represents an output timing of the frame synchronization signal. "Shutter/read" depicted in FIG. 6 represents timings of exposure (shutter) and data reading (read) in the solid-state image pickup element. "Bidirectional IF" depicted in FIG. 6 indicates a transmission state of data from the transmission device 10A to the reception device 10B.

In the rolling shutter method, an exposure timing and a data reading timing are different for each row in a plurality of pixels constituting an imaging region of the solid-state image pickup element. Accordingly, as depicted in FIG. 6, the exposure timing ST and the data reading timing RD are shifted for each row in the frame period FP of each frame.

As depicted in FIG. 6, the transmission device 10A transmits the register signal Rs including the standby sequential information SS to the reception device 10B, and then executes the host communication using the frame period FP. Furthermore, in a case of transmitting the standby sequential information SS to the reception device 10B, the transmission device 10A stops reading data at the subsequent first data read timing RDs. On the other hand, in a case of transmitting the standby sequential information SS to the reception device 10B, the transmission device 10A performs exposure for each row at the exposure timing without stopping the exposure in the solid-state image pickup element.

As described above, while the host communication is being executed, the transmission device 10A stops reading data but continues the exposure. Thus, in a case of transmitting the training sequential information TS to the reception device 10B, the transmission device 10A can execute reading of data at the first data reading timing RDf thereafter. Therefore, the transmission device 10A, the reception device 10B, and the transmission-reception system 1 according to the present modification can read data of exposure performed at an exposure timing STs during execution of the host communication as valid data.

(Modification 2)

Figure 7:
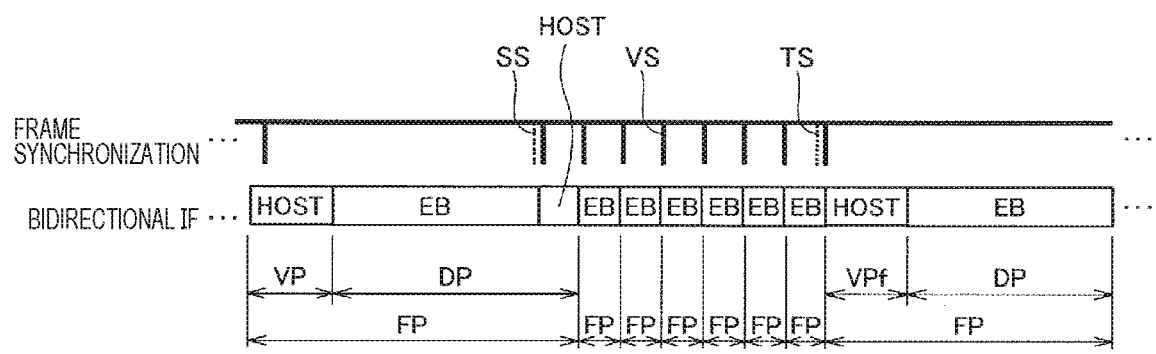
FIG. 7 is a diagram depicting an example of a timing chart of a transmission device, a reception device, and a transmission-reception system according to Modification 2 of the first embodiment of the present disclosure.

A transmission device, a reception device, and a transmission-reception system according to Modification 2 of the present embodiment will be described with reference to FIG. 7. The transmission device 10A, the reception device 10B, and the transmission-reception system 1 according to the present modification are characterized in that they operate at a high frame rate for a certain period and then automatically return to the normal frame rate. "Frame synchronization" depicted in FIG. 7 represents an output timing of the frame synchronization signal. "Bidirectional IF" depicted in FIG. 7 indicates a transmission state of data from the transmission device 10A to the reception device 10B.

The transmission device 10A stores, in the register 113, the frame period FP in the first communication (that is, communication at a normal frame rate) in which the host communication is performed in the blanking period VP, or the number of times of processing of data output at the high frame rate and switching information between the first communication and the second communication which are included in the register signal Rs received at the time of activation of the transmission-reception system 1. Accordingly, as depicted in FIG. 7, the control unit 111 provided in the transmission device 10A transmits the standby sequential information SS to the reception device 10B on the basis of the switching information stored in the register 113, and executes the host communication in a first frame period FPf after transmitting the standby sequential information SS. On the basis of the information stored in the register 113, the control unit 111 controls the data source 12, the data transmission unit 115, and the link unit 117 so as to transmit the clock embedded signal EB to the reception device 10B by the frame period FP and the number of times of processing (in this example, five times) stored in the register 113 from the next frame of the frame in which the host communication has been executed. In this manner, the transmission device 10A transmits the predetermined number of clock embedded signals EB to the reception device 10B at a high frame rate.

The control unit 111 causes the reception device 10B to transmit the clock embedded signal EB by the number of times of processing stored in the register 113. Furthermore, the control unit 111 causes the training sequential information TS to be included in the last clock embedded signal EB of the number of times of processing, and transmitted by the reception device 10B. Thus, the host communication is executed in a blanking period VPf of the frame next to the frame in which the last clock embedded signal EB of the number of times of processing stored in the register 113 is transmitted. In this manner, by the control unit 111 switching from the second communication to the first communication, the transmission device 10A transmits the clock embedded signal EB to the reception device 10B at the normal frame rate. The transmission device 10A, the reception device 10B, and the transmission-reception system 1 according to the present modification are configured not to transition to the host communication at a high frame rate except for a first frame period FP in which the first communication is switched to the second communication.

As described above, in the reception device 10B according to the present modification, the control unit 111 is configured to switch to the normal frame rate after outputting data at the high frame rate in a plurality of frames.

The transmission device, the reception device, and the transmission-reception system according to the present modification are configured to transition to processing at the high frame rate during processing at the normal frame rate, execute a predetermined number of frames at the high frame rate, and then automatically return to the normal frame rate. Thus, the present modification can be applied to a transmission device, a reception device, and a transmission-reception system including a solid-state image pickup element set to perform imaging at a high speed only in a certain predetermined period. In the present modification, the number of times of processing of data output at the high frame rate may be either fixed or variable.

As described above, in the transmission device, the reception device, and the transmission-reception system according to the present embodiment and Modifications 1 and 2, the transmission device 10A and the reception device 10B are configured to bidirectionally communicate by the common wiring. Moreover, the clock embedded signal in which the first clock signal is embedded is transmitted from the transmission device to the reception device. Thus, the transmission device, the reception device, and the transmission-reception system according to the present embodiment and Modifications 1 and 2 can achieve downsizing and communication at the high frame rate. Furthermore, the transmission device, the reception device, and the transmission-reception system according to the present embodiment and Modifications 1 and 2 can operate at the high frame rate without being limited by the host communication in which a condition of bidirectional communication is changed.

Incidentally, flexibility of control change by high-frame-rate operation or the host communication is required for the solid-state image pickup element. However, it is not always desired to change the operation of the solid-state image pickup element by the host communication every time at the high frame rate. In order to see a scene change, it is desired to capture an image at a high speed, but it is not desired to change the parameter every time. There is a case where it is sufficient to maintain the high frame rate and change the parameter only once in several tens to several thousands of frames or more. That is, there is a case where it is sufficient to execute the host communication only once in a plurality of frames. A transmission device, a reception device, and a transmission-reception system according to the second and third embodiments described below relate to a device and a system capable of such an operation.

The transmission device, the reception device, and the transmission-reception system according to the second and third embodiments can be applied, for example, in a case where the change of the parameter depending on the environment (temperature, brightness, or the like) is in units of several seconds to several hours, or in a case where the change of the parameter due to a scene change is from several tens of milliseconds to several seconds. Furthermore, the transmission device, the reception device, and the transmission-reception system according to the second and third embodiments can be applied to, for example, a case where the number of frames is designated for a predetermined scene and imaging is performed at a high speed. The transmission device, the reception device, and the transmission-reception system according to the second and third embodiments can be applied to, for example, a case where transition is made to high frame rate processing during the normal frame rate, imaging of a predetermined number of frames is executed at the high frame rate, and then the frame rate is automatically returned to the normal frame rate. Furthermore, the transmission device, the reception device, and the transmission-reception system according to the second and third embodiments can be applied to, for example, a case of capturing an image of a moment at which an object to be captured comes in factory automation. Furthermore, the transmission device, the reception device, and the transmission-reception system according to the second and third embodiments can be applied to, for example, a case of imaging an object operating at a high speed or changing rapidly (for example, vocal cords, pulse, ocular reflex, or the like) in the medical field. Moreover, the transmission device, the reception device, and the transmission-reception system according to the second and third embodiments can be applied to, for example, a case of imaging an object that suddenly starts moving, such as a dolphin at a moment of jumping, a firework at a moment of setting off, or an animal at a moment of running, in a general camera.

Second Embodiment

A transmission device, a reception device, and a transmission-reception system according to a second embodiment of the present disclosure will be described with reference to FIGS. 8 and 9. The transmission device, the reception device, and the transmission-reception system according to the present embodiment are characterized in including a plurality of data transmission units and a plurality of data reception units. Note that components having the same operations and functions as those of the transmission device, the reception device, and the transmission-reception system according to the first embodiment described above are denoted by the same reference numerals, and description thereof is omitted.

The transmission device, the reception device, and the transmission-reception system according to the present embodiment transmit and receive data for transmission and a clock signal for synchronization by the clock embedded method. Moreover, in the transmission device, the reception device, and the transmission-reception system according to the present embodiment, each of the plurality of data transmission units and the plurality of data reception units transmits and receives data by the clock embedded method.

Figure 8:
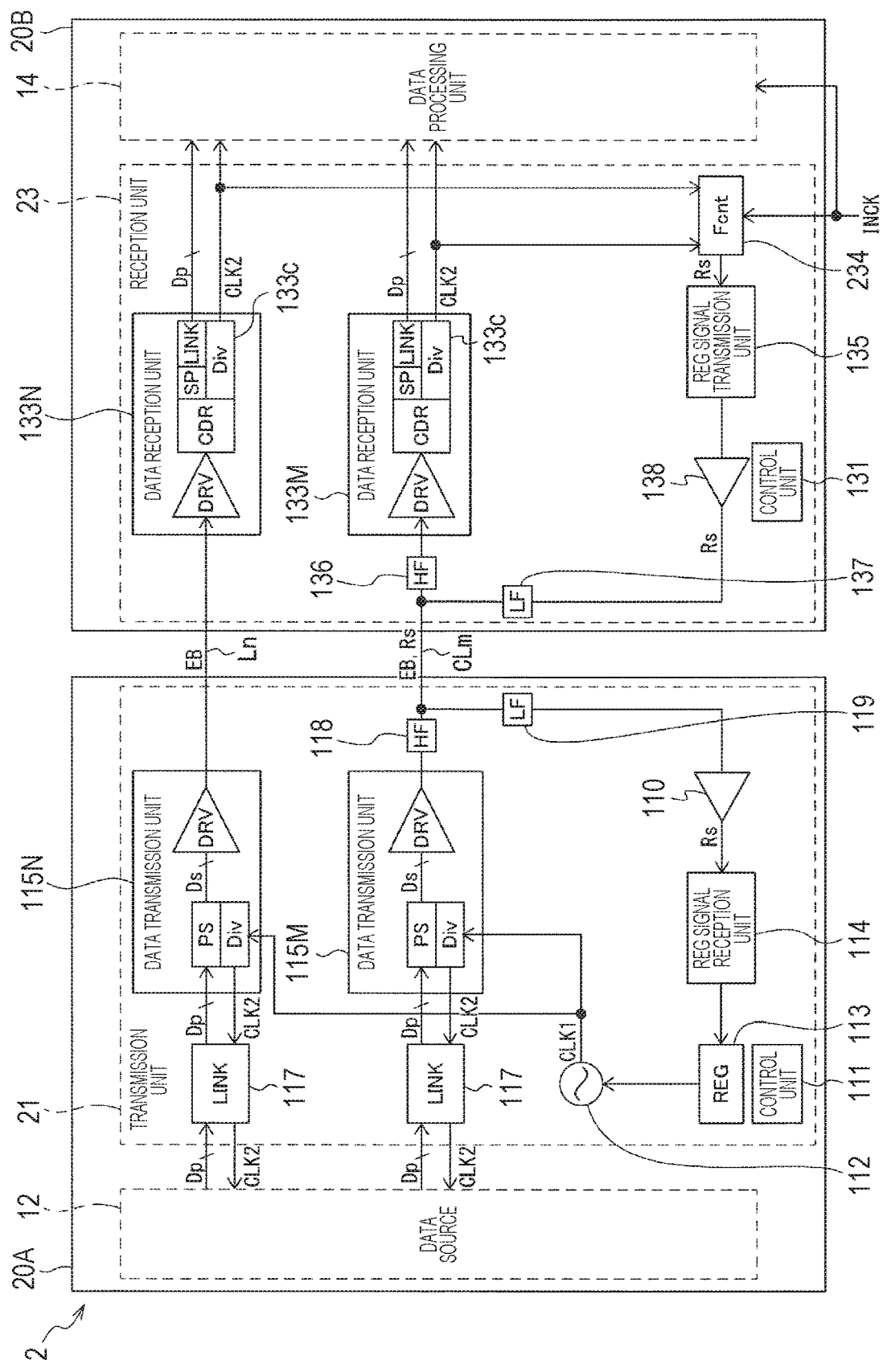
FIG. 8 is a functional block diagram depicting a schematic configuration of a transmission device, a reception device, and a transmission-reception system according to a second embodiment of the present disclosure.

As depicted in FIG. 8, the transmission-reception system 2 according to the present embodiment includes a transmission device 20A that transmits a predetermined signal and a reception device 20B that receives the predetermined signal transmitted from the transmission device 20A. The transmission-reception system 2 can be applied to, for example, an endoscope system, and the transmission device 20A transmits imaging data imaged by the transmission device 20A to the reception device 20B. The reception device 20B processes the imaging data transmitted from the transmission device 20A and transmits the processed imaging data to, for example, a display apparatus (not depicted). Thus, the transmission device 20A is downsized so as to be capable of entering a narrow area such as the inside of a human body. Furthermore, the reception device 20B has a configuration capable of receiving imaging data from the downsized transmission device 20A and controlling the clock signal in order to stably operate the transmission device 20A.

The transmission unit 21 included in the transmission device 20A includes a first data transmission unit 115M and a second data transmission unit 115N. Each of the first data transmission unit 115M and the second data transmission unit 115N has the same configuration as the data transmission unit 115 in the first embodiment described above and exerts the same function. Thus, the description of the configurations of the first data transmission unit 115M and the second data transmission unit 115N will be omitted.

As depicted in FIG. 8, the first data transmission unit 115M included in the transmission unit 21 of the transmission device 10A is configured to transmit data Dp (an example of a data signal) input from a data source (an example of the data generation unit) 12 to the reception device 20B (an example of the external device) using a common wiring CLm (an example of a predetermined wiring) through which a register signal (an example of the control signal) Rs is transmitted.

The second data transmission unit 115N included in the transmission unit 21 of the transmission device 10A is configured to transmit the data Dp input from the data source 12 to the reception device 20B using a wiring CLn different from the common wiring CLm through which the register signal Rs is transmitted.

The reception unit 23 included in the reception device 20B includes a first data reception unit 133M and a second data reception unit 133N. Each of the first data reception unit 133M and the second data reception unit 133N has the same configuration as the data reception unit 133 in the first embodiment described above and exerts the same function. Thus, the description of the configurations of the first data reception unit 133M and the second data reception unit 133N will be omitted. The reception unit 23 includes the same number of data reception units as the data transmission units provided in the transmission unit 21. In the present embodiment, the transmission unit 21 includes two data transmission units (the first data transmission unit 115M and the second data transmission unit 115N), and thus the reception unit 23 also includes two data reception units (the first data reception unit 133M and the second data reception unit 133N).

As depicted in FIG. 8, the first data reception unit 133M included in the reception unit 23 of the reception device 20B is configured to receive the clock embedded signal (an example of the data signal) EB transmitted from the transmission device 20A (an example of the external device) using the common wiring CLm through which the register signal (an example of the control signal) Rs is transmitted. The reproduction unit 136 is connected to an input terminal of the first data reception unit 133M, and the reproduction unit 118 is connected to an output terminal of the first data transmission unit 115M. The common wiring CLm connects the reproduction unit 118 and the reproduction unit 136. Thus, the first data reception unit 133M is connected to the first data transmission unit 115M via the reproduction unit 136, the common wiring CLm, and the reproduction unit 118.

The second data reception unit 133N included in the reception unit 23 of the reception device 20B is configured to receive the clock embedded signal EB output from the transmission device 20A using the wiring CLn different from the common wiring CLm through which the register signal Rs is transmitted. The reproduction unit is not provided on an input side of the second data reception unit 133N. Similarly, the reproduction unit is not provided on an output side of the second data transmission unit 115N. Thus, the second data reception unit 133N is connected to the second data transmission unit 115N via the wiring CLn. As described above, the data transmission units provided in the transmission unit 21 and the data reception units provided in the reception unit 23 are connected in a one-to-one relationship.

The respective second clock signals CLK2 output from the plurality of data reception units 233 are input to the signal generation unit 234 included in the reception unit 23. The signal generation unit 234 compares the two second clock signals CLK2 respectively input from the first data reception unit 133M and the second data reception unit 133N with the reference clock signal INCK. Thus, even if transmission of the first clock signal CLK1 in any of the first data transmission unit 115M and the second data transmission unit 115N and the first data reception unit 133M and the second data reception unit 133N fails, the signal generation unit 234 can control the first clock signal CLK1 by comparing the second clock signal CLK2 with the reference clock signal INCK. Furthermore, the signal generation unit 234 may be configured to compare any of the plurality of second clock signals CLK2 with the reference clock signal INCK.

As depicted in FIG. 8, the wiring through which the register signal Rs is transmitted and received is not connected to the wiring CLn. Accordingly, in the transmission-reception system 2 according to the present embodiment, the register signal Rs is transmitted from the reception device 20B to the transmission device 20A by the first data transmission unit 115M and the first data reception unit 133M. Furthermore, the first data transmission unit 115M has a similar configuration to that of the data transmission unit 115 in the first embodiment described above, and the first data reception unit 133M has a similar configuration to that of the data reception unit 133 in the first embodiment described above. Thus, in the transmission-reception system 2, the clock embedded signal EB including the data Dp acquired by the data source 12 can be transmitted and received by the first data transmission unit 115M and the first data reception unit 133M.

On the other hand, in the transmission-reception system 2, the clock embedded signal EB including the data Dp acquired by the data source 12 can be transmitted and received between the transmission device 20A and the reception device 20B by the second data transmission unit 115N and the second data reception unit 133N.

As described above, the transmission device 20A, the reception device 20B, and the transmission-reception system 2 according to the present embodiment have two communication paths for data transmission and reception. Moreover, the communication path constituted by the first data transmission unit 115M, the common wiring CLm, and the first data reception unit 133M, which is one of the communication paths, can transmit and receive not only data but also the register signal Rs. Thus, the transmission device 20A, the reception device 20B, and the transmission-reception system 2 according to the present embodiment can reduce the number of terminals of each of the transmission device and the reception device and the number of wirings between the transmission device and the reception device as compared with a system configured to separately transmit and receive data and a register signal.

(Operations of Transmission Device, Reception Device, and Transmission-Reception System)

Operations of the transmission device 20A, the reception device 20B, and the transmission-reception system 2 according to the present embodiment will be described with reference to FIG. 9 while referring to FIG. 8. "Frame synchronization" depicted in FIG. 9 represents an output timing of the frame synchronization signal. A "second communication path" depicted in FIG. 9 represents the communication path using the second data transmission unit 115N and the second data reception unit 133N depicted in FIG. 8. A "first communication path" depicted in FIG. 9 represents the communication path using the first data transmission unit 115M and the first data reception unit 133M depicted in FIG. 8.

Figure 9:
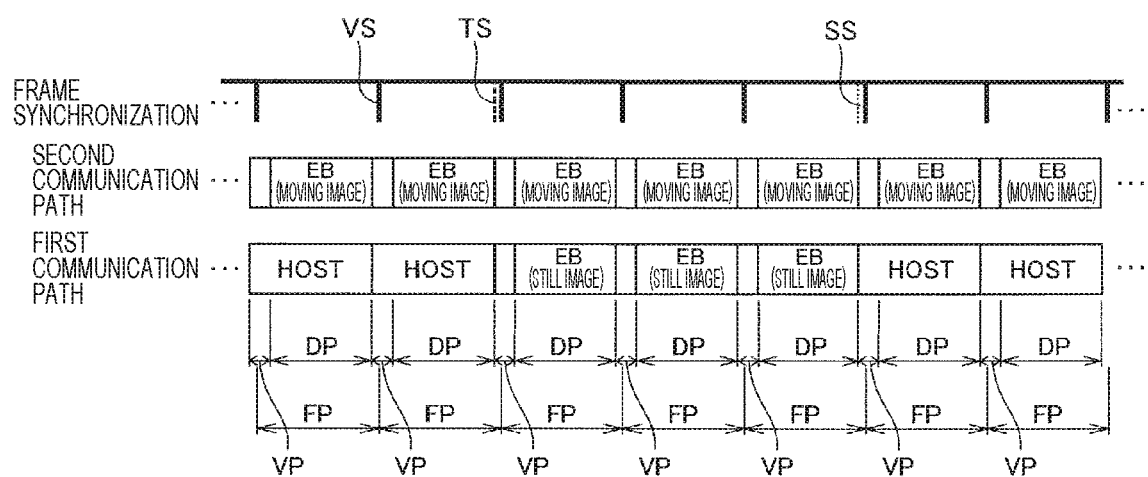
FIG. 9 is a diagram depicting an example of a timing chart of a transmission device, a reception device, and a transmission-reception system according to a second embodiment of the present disclosure.

As depicted in FIG. 9, in the normal operation, the second data transmission unit 115N and the second data reception unit 133N transmit the clock embedded signal EB from the transmission device 20A to the reception device 20B in each frame period FP. In the example depicted in FIG. 9, the clock embedded signal EB transmitted from the transmission device 20A to the reception device 20B by the second data transmission unit 115N and the second data reception unit 133N includes moving image data. On the other hand, the communication path using the first data transmission unit 115M and the first data reception unit 133M is in a state in which the host communication can be executed using at least one frame. In the present embodiment, the host communication is not executed in every frame using the first data transmission unit 115M and the first data reception unit 133M, but is executed as necessary in a case where the frame period FP or the frame rate is changed.

For example, it is assumed that the user using the transmission-reception system 2 executes an operation for capturing a still image while capturing a moving image in the data source 12 (see FIG. 8). Then, the control unit 131 (see FIG. 8) provided in the reception device 20B sets the register signal Rs including the information regarding the operation in the register signal transmission unit 135 (see FIG. 8). The register signal transmission unit 135 transmits the register signal Rs to the transmission device 20A.

Upon acquiring information instructing to capture a still image from the register signal Rs transmitted from the reception device 20B and received by the register signal reception unit 114, the control unit 111 provided in the transmission device 20A stores the information in the register 113. Moreover, the control unit 111 transmits the training sequential information as the second information to the reception device 20B, and switches the communication path in which the first data transmission unit 115M is used from the second communication to the first communication. Thus, as depicted in FIG. 9, the first data transmission unit 115M transmits the clock embedded signal EB including the data Dp (for example, still image data) acquired by the data source 12 to the first data reception unit 133M in the data output period DP of the first frame period FP after transmitting the training sequential information TS.

The transmission device 20A transmits the clock embedded signal EB including the data Dp (still image data) in a predetermined number of frames (three times in this example) to the reception device 20B on the basis of, for example, the information instructing capturing of a still image stored in the register 113. Furthermore, the transmission device 20A transmits the clock embedded signal EB including the standby sequential information SS as the first information to the reception device 20B in the last frame. Thus, the communication path in which the first data transmission unit 115M is used is switched from the first communication to the second communication.

Meanwhile, the transmission device 20A continues to transmit the clock embedded signal EB including the data Dp (for example, moving image data) from the second data transmission unit 115N. Thus, the transmission device 20A, the reception device 20B, and the transmission-reception system 2 according to the present embodiment can transmit and receive different types of data in parallel.

As described above, the transmission device, the reception device, and the transmission-reception system according to the present embodiment are configured to bidirectionally communicate by the common wiring. Moreover, the clock embedded signal in which the first clock signal is embedded is transmitted from the transmission device to the reception device. Thus, the transmission device, the reception device, and the transmission-reception system according to the present embodiment can achieve downsizing and communication at the high frame rate. Furthermore, the transmission device, the reception device, and the transmission-reception system according to the present embodiment can operate at the high frame rate without being limited by the host communication in which a condition of bidirectional communication is changed.

Furthermore, the transmission device, the reception device, and the transmission-reception system according to the present embodiment are configured such that, in the normal operation, the second data transmission unit and the second data reception unit transmit and receive the clock embedded signal including data, and the first data transmission unit and the first data reception unit transmit and receive the register signal. Thus, the transmission device, the reception device, and the transmission-reception system according to the present embodiment can prevent data communication from being rate limited by the host communication.

Moreover, in the transmission device, the reception device, and the transmission-reception system according to the present embodiment, data (for example, still image data) different from the data (for example, moving image data) transmitted and received by the second data transmission unit and the second data reception unit can be transmitted and received by the first data transmission unit and the first data reception unit. Thus, the transmission device, the reception device, and the transmission-reception system according to the present embodiment can transmit and receive data and host communication in parallel during the normal operation, and can transmit and receive high-speed and large-capacity data by transmitting and receiving data instead of the host communication as necessary.

Third Embodiment

A transmission device, a reception device, and a transmission-reception system according to a third embodiment of the present disclosure will be described with reference to FIGS. 10 and 11. The transmission device, the reception device, and the transmission-reception system according to the present embodiment are characterized in that they can exhibit what is called always-on function. Note that components having the same operations and functions as those of the transmission device, the reception device, and the transmission-reception system according to the second embodiment described above are denoted by the same reference numerals, and description thereof is omitted.

The transmission device, the reception device, and the transmission-reception system according to the present embodiment transmit and receive data for transmission and a clock signal for synchronization by the clock embedded method. Moreover, in the transmission device, the reception device, and the transmission-reception system according to the present embodiment, each of the plurality of data transmission units and the plurality of data reception units transmits and receives data by the clock embedded method.

Figure 10:
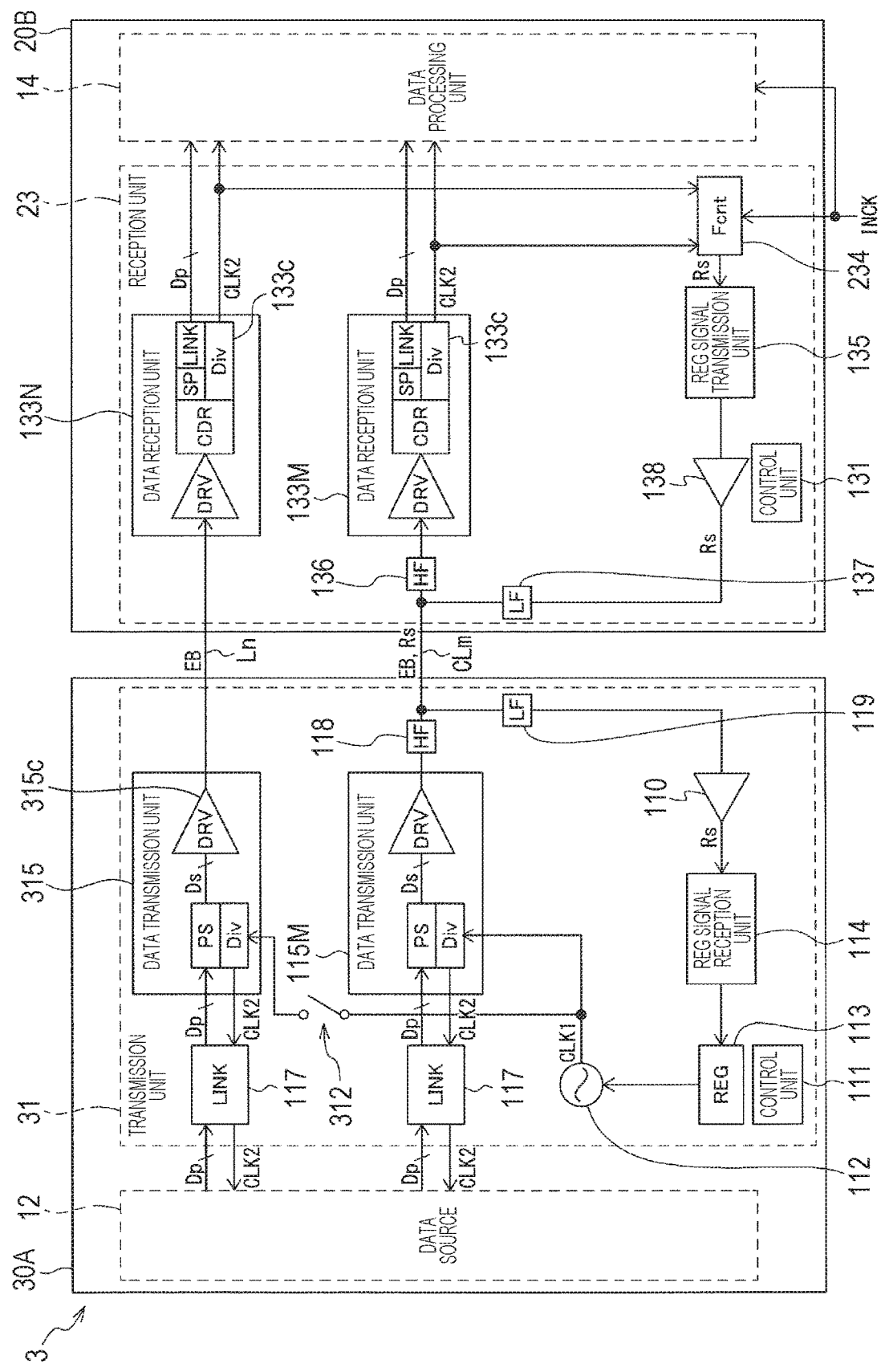
FIG. 10 is a functional block diagram depicting a schematic configuration of a transmission device, a reception device, and a transmission-reception system according to a third embodiment of the present disclosure.

As depicted in FIG. 10, the transmission unit 31 included in the transmission device 30A according to the present embodiment includes a second data transmission unit 315 including a driver 315c capable of bringing an output into a high-impedance state. The second data transmission unit 315 has a similar configuration to that of the second data transmission unit 115N in the second embodiment described above except that the driver 315c is different, and exhibits a similar function.

The transmission unit 31 provided in the transmission device 30A includes a switch 312 provided between the oscillator 112 and the frequency divider 115a. In a case where the switch 312 is in a closed state (on state), the first clock signal CLK1 oscillated by the oscillator 112 is input to the frequency divider 115a. On the other hand, in a case where the switch 312 is in an open state (off state), the first clock signal CLK1 oscillated by the oscillator 112 is not input to the frequency divider 115a. Therefore, when the switch 312 is in the open state (off state), the frequency divider 115a does not output the second clock signal CLK2 to the link unit 117. Thus, the operations of the second data transmission unit 315 and the link unit 117 connected to the second data transmission unit 315 are stopped.

The control unit 111 controls opening and closing of the switch 312. Although details will be described later, in the normal operation, the control unit 111 controls the switch 312 to be in an open state (off state) and controls the output of the driver 315c to be in a high-impedance state. Thus, the second data transmission unit 315, and the link unit 117 and the second data reception unit 133N connected to the second data transmission unit 315 are stopped. On the other hand, in an operation (that is, high-speed operation) at the high frame rate higher than the normal frame rate, the control unit 111 controls the switch 312 to be in a closed state (on state) and controls the driver 315c to be in a state capable of outputting. Accordingly, the second data transmission unit 315, the link unit 117 connected to the second data transmission unit 315, and the second data reception unit 133N are brought into an operating state. Thus, in the transmission-reception system 3, the second data transmission unit 315 and the second data reception unit 133N can transmit a large volume of data from the transmission device 30A to the reception device 20B.

As described above, the control unit 111 is configured to stop outputting the clock embedded signal EB (an example of data) from the second data transmission unit 315 in a case where one frame period has a normal frame rate of a predetermined period, and output the clock embedded signal EB from the second data transmission unit 315 in a case where the one frame period has a high frame rate higher than the frame rate of the normal frame.

(Operations of Transmission Device, Reception Device, and Transmission-Reception System)

Operations of the transmission device 30A, the reception device 20B, and the transmission-reception system 3 according to the present embodiment will be described with reference to FIG. 11 while referring to FIG. 10. "Frame synchronization" depicted in FIG. 11 represents an output timing of the frame synchronization signal. A "second communication path" depicted in FIG. 11 represents a communication path using the second data transmission unit 115N and the second data reception unit 133N depicted in FIG. 10. A "first communication path" depicted in FIG. 11 represents a communication path using the first data transmission unit 115M and the first data reception unit 133M depicted in FIG. 10.

Figure 11:
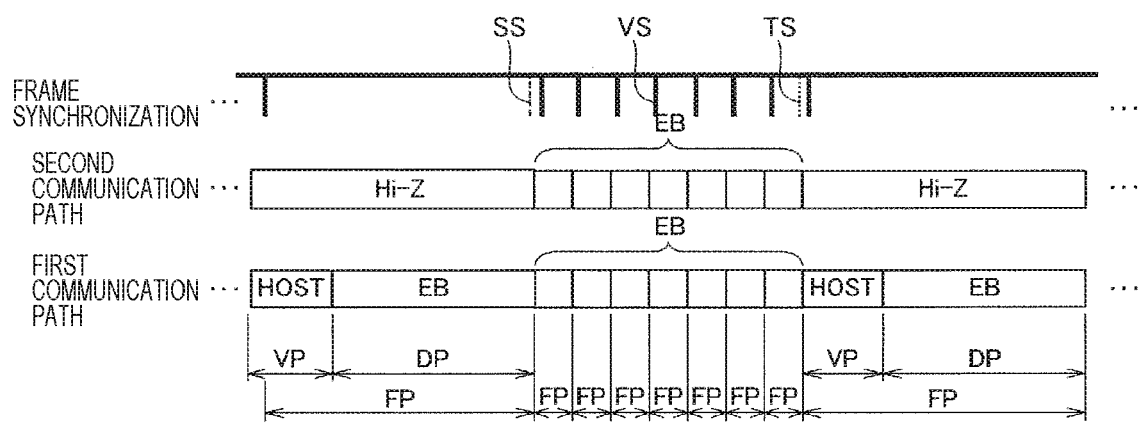
FIG. 11 is a diagram depicting an example of a timing chart of a transmission device, a reception device, and a transmission-reception system according to a third embodiment of the present disclosure.

As depicted in FIG. 11, in the normal operation, the driver 315c (see FIG. 10) of the second data transmission unit 315 provided in the transmission unit 31 of the transmission device 30A is controlled so that the output state is in a high-impedance state. Thus, the second data transmission unit 315 and the reception device 20B provided in the reception unit 23 of the second data reception unit 133N are in a high-impedance (Hi-Z) state. On the other hand, in the normal state, in the data output period DP, the clock embedded signal EB is transmitted from the transmission device 30A to the reception device 20B by the first data transmission unit 115M and the first data reception unit 133M. Furthermore, in the normal operation, the host communication is executed as necessary in the blanking period VP.

For example, it is assumed that the user using the transmission-reception system 3 executes an operation for operating at the high frame rate (that is, high-speed operation). Then, the control unit 131 (see FIG. 10) included in the reception device 20B sets the register signal Rs including the information regarding the operation in the register signal transmission unit 135 (see FIG. 10). The register signal transmission unit 135 transmits the register signal Rs to the transmission device 30A.

Upon acquiring information instructing the high frame rate operation from the register signal Rs transmitted from the reception device 20B and received by the register signal reception unit 114, the control unit 111 provided in the transmission device 30A stores the information in the register 113 and transmits the standby sequential information SS as the first information to the reception device 30B. Moreover, the control unit 111 controls the switch 312 to be in a closed state (on state) and controls the driver 315c to be in a state capable of output. Thus, as depicted in FIG. 11, the second data transmission unit 315 transmits the clock embedded signal EB including the data Dp acquired by the data source 12 to the second data reception unit 133N in the data output period DP (not depicted in FIG. 11) of the first frame period FP after transmitting the standby sequential information SS.

For example, the transmission device 30A transmits the clock embedded signal EB to the reception device 30B at the high frame rate in a predetermined number of frames (seven times in this example) on the basis of the information instructing the high frame rate operation stored in the register 113. Furthermore, the transmission device 30A transmits the clock embedded signal EB including the training sequential information TS as the second information to the reception device 30B in the last frame. Moreover, the control unit 111 controls the switch 312 to be in an open state (off state) and controls the output of the driver 315c to be in a high-impedance state. Thus, the second data transmission unit 315, and the link unit 117 and the second data reception unit 133N connected to the second data transmission unit 315 are stopped.

On the other hand, the transmission device 30A continues to transmit the clock embedded signal EB including data Dp different from the data Dp transmitted by the second data transmission unit 315 from the first data transmission unit 115M to the reception device 20B. Thus, the transmission device 30A, the reception device 20B, and the transmission-reception system 3 according to the present embodiment can transmit and receive a large volume of data in a case of operating at the high frame rate as compared with a case of operating at the normal frame rate.

As described above, the transmission device, the reception device, and the transmission-reception system according to the present embodiment are configured to bidirectionally communicate by the common wiring. Moreover, the clock embedded signal in which the first clock signal is embedded is transmitted from the transmission device to the reception device. Thus, the transmission device, the reception device, and the transmission-reception system according to the present embodiment can achieve downsizing and communication at the high frame rate. Furthermore, the transmission device, the reception device, and the transmission-reception system according to the present embodiment can operate at the high frame rate without being limited by the host communication in which a condition of bidirectional communication is changed.

Furthermore, the transmission device, the reception device, and the transmission-reception system according to the present embodiment can achieve low power consumption by stopping the second data transmission unit and the second data reception unit in the normal operation. The transmission device, the reception device, and the transmission-reception system according to the present embodiment can be implemented as, for example, a motion detection device and system that can operate with low power consumption in a case where the data source is configured to be capable of executing motion detection.

For example, in a case where the data source detects no motion of the predetermined object, the amount of data transmitted from the transmission device to the reception device is small. Thus, in the transmission device, the reception device, and the transmission-reception system according to the present embodiment, the first data transmission unit and the second data transmission unit transmit and receive low-resolution data, and the second data transmission unit and the second data reception unit are stopped, so that transmission and reception of data with low power can be achieved. On the other hand, in a case where the data source detects a motion of the predetermined object, the amount of data transmitted from the transmission device to the reception device increases. Thus, the transmission device, the reception device, and the transmission-reception system according to the present embodiment can achieve transmission and reception of high-resolution data by transmitting and receiving data by the second data transmission unit and the second data reception unit in addition to the first data transmission unit and the second data transmission unit.
<Example of Application to Endoscopic Surgery System>

The technology according to the present disclosure (the present technology) can be applied to various products. For example, the technology according to the present disclosure may be applied to an endoscopic surgery system.

Figure 12:
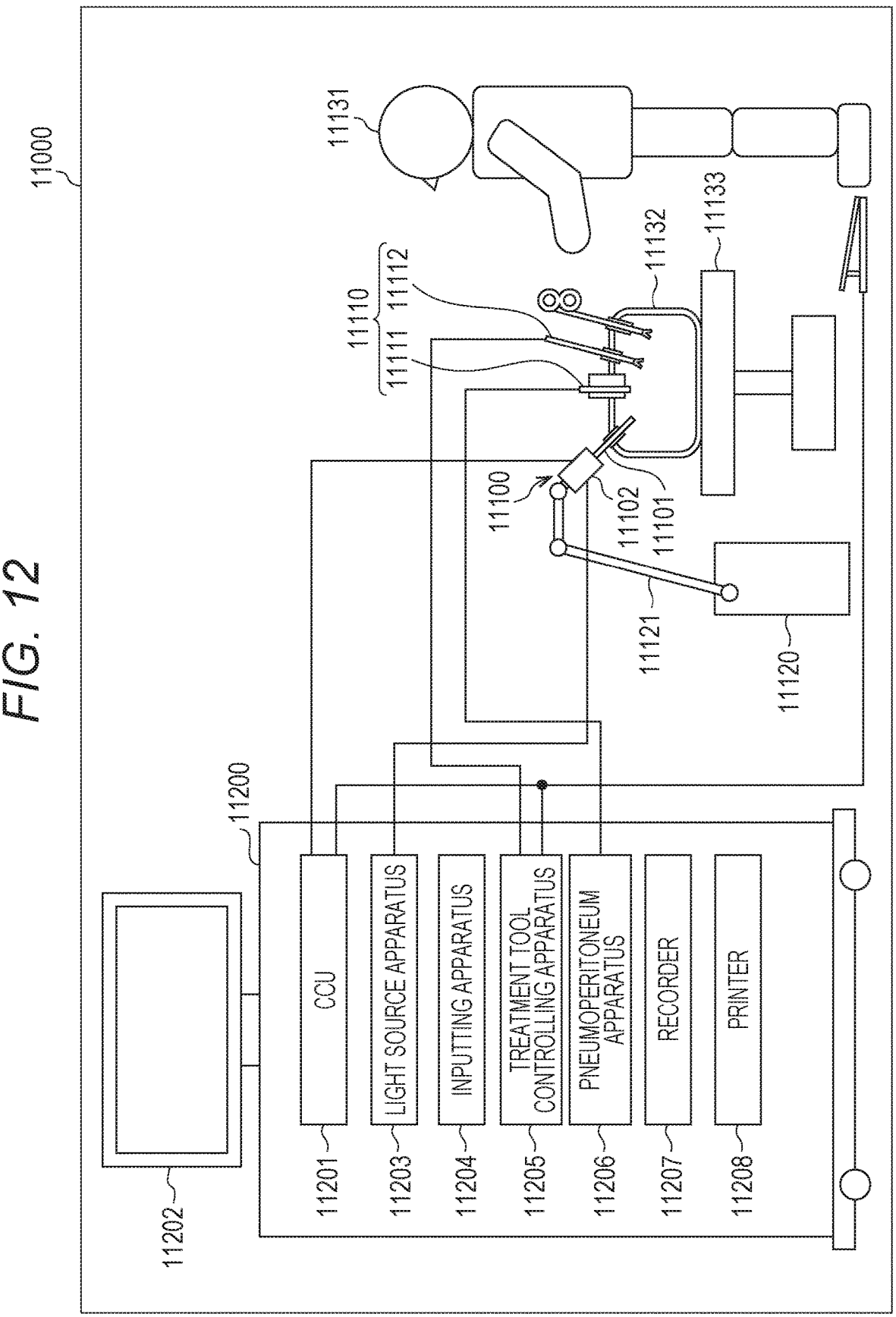
FIG. 12 is a view depicting an example of a schematic configuration of an endoscopic surgery system.

FIG. 12 is a view depicting an example of a schematic configuration of an endoscopic surgery system to which the technology according to an embodiment of the present disclosure (present technology) can be applied.

In FIG. 12, a state is depicted in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 13:
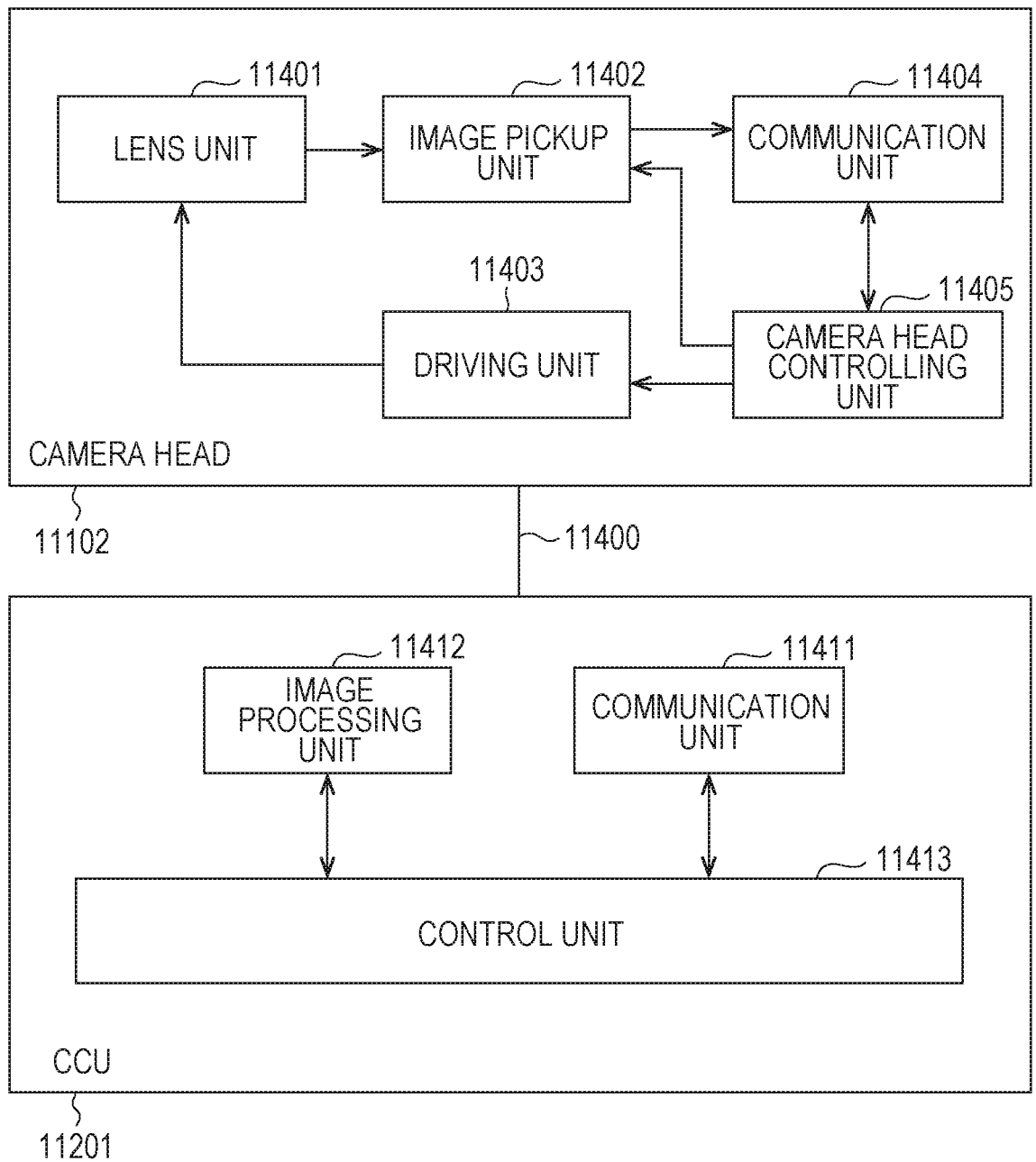
FIG. 13 is a block diagram depicting an example of a functional configuration of a camera head and a camera control unit (CCU).

FIG. 13 is a block diagram depicting an example of a functional configuration of the camera head 11102 and the CCU 11201 depicted in FIG. 12.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

The example of the endoscopic surgery system to which the technology according to the present disclosure can be applied has been described above. The technology according to the present disclosure can be used for an interface between the camera head 11102 and the CCU 11201 among the above-described configurations. Specifically, the data source 12 can be applied to the image pickup unit 11402. The transmission units 11, 21, and 31 can be applied to the camera head controlling unit 11405 and the communication unit 11404. The reception units 13 and 23 can be applied to the communication unit 11411. By applying the technology according to the present disclosure to the interface between the camera head 11102 and the CCU 11201, the camera head 11102 can be downsized, and data can be transmitted and received at a high frame rate without being limited by the host communication.

Note that, here, the endoscopic surgery system has been described as an example, but the technology according to the present disclosure may be applied to other, for example, microscopic surgery systems and the like.

The technology according to the present disclosure can be applied to the transmission device, the reception device, and the transmission-reception system as described above.

Note that the embodiments of the present technology are not limited to the above-described embodiments, and various modifications are possible without departing from the gist of the present technology. Furthermore, the effects described herein are merely examples and are not limited, and other effects may be provided.

For example, the present technology can have configurations as follows.

(1)

A transmission device including:
a control signal reception unit that receives a control signal input from an external device and including predetermined information; and
a control unit that performs control on the basis of switching information included in the predetermined information as necessary, the switching information indicating switching between the first communication in which host communication is executed in a blanking period among one frame period and the second communication in which host communication is executed in a blanking period and a data output period among one frame period.

(2)

The transmission device according to (1) above, in which the control unit switches from the first communication to the second communication in a case where the one frame period has a high frame rate higher than a normal frame rate of a predetermined period.

(3)

The transmission device according to (2) above, in which the control unit switches to the normal frame rate after outputting data at the high frame rate in a plurality of frames.

(4)

The transmission device according to (1) or (2) above, in which
the control unit
controls transmission of first information to the external device when switching from the first communication to the second communication, and
controls transmission of second information to the external device when switching from the second communication to the first communication.

(5)

The transmission device according to (4) above, in which the first information is standby sequential information, and the second information is training sequential information.

(6)

The transmission device according to any one of (1) to (5) above, further including
a first data transmission unit that transmits a data signal input from a data generation unit to the external device by using a predetermined wiring through which the control signal is transmitted.

(7)

The transmission device according to (6) above, further including
a second data transmission unit that transmits a data signal input from the data generation unit to the external device by using a wiring different from the predetermined wiring through which the control signal is transmitted.

(8)

The transmission device according to (7) above, in which the control unit stops outputting the data signal from the second data transmission unit in a case where the one frame period has a normal frame rate of a predetermined period, and outputs the data signal from the second data transmission unit in a case where the one frame period has a high frame rate higher than the normal frame rate.

(9)

The transmission device according to any one of (1) to (8) above, in which
a signal is bidirectionally communicated with the external device according to a standard of Scalable Low Voltage Signaling with Embedded Clock (SLVS-EC).

(10)

A reception device, including:
a control signal transmission unit that transmits, to an external device, a control signal including predetermined information including switching information as necessary, the switching information indicating switching between the first communication in which host communication is executed in a blanking period among one frame period and the second communication in which host communication is executed in a blanking period and a data output period among one frame period; and
a control unit that controls transmission of the control signal from the control signal transmission unit.

(11)

The reception device according to (10) above, in which
in a case of determining that first information is transmitted from the external device, the control signal transmission unit transmits the control signal to the external device as necessary, and
in a case of determining that second information is transmitted from the external device, the control signal transmission unit stops the transmission of the control signal to the external device.

(12)

The reception device according to (11) above, in which the first information is standby sequential information, and the second information is training sequential information.

(13)

The reception device according to any one of (10) to (12) above, further including a first data reception unit that receives a data signal transmitted from the external device by using a predetermined wiring through which the control signal is transmitted.

(14)

The reception device according to (12) above, further including a second data reception unit that receives a data signal output from the external device by using a wiring different from a predetermined wiring through which the control signal is transmitted.

(15)

The reception device according to any one of (10) to (14) above, in which a signal is bidirectionally communicated with the external device according to a standard of Scalable Low Voltage Signaling with Embedded Clock (SLVS-EC).

(16)

A transmission-reception system, including:

a transmission device that transmits a predetermined signal; and a reception device that receives the predetermined signal transmitted from the transmission device, in which the transmission device includes a control signal reception unit that receives a control signal input from the reception device and including predetermined information, and a control unit that performs control on the basis of switching information included in the predetermined information as necessary, the switching information indicating switching between the first communication in which host communication is executed in a blanking period among one frame period and the second communication in which host communication is executed in a blanking period and a data output period among one frame period, and the reception device includes a control signal transmission unit that transmits, to the transmission device, a control signal included in the predetermined information in which the switching information is included as necessary, and a control unit that controls transmission of the control signal to the control signal transmission unit.

(17)

The transmission-reception system according to (16) above, in which the transmission device and the reception device bidirectionally communicate a signal according to a standard of Scalable Low Voltage Signaling with Embedded Clock (SLVS-EC).

REFERENCE SIGNS LIST 1, 2, 3 Transmission-reception system
10A, 20A, 30A Transmission device
10B, 20B Reception device
11, 21, 31 Transmission unit
12 Data source
13, 23 Reception unit
14 Data processing unit
110, 138 Buffer unit
111, 131 Control unit
112 Oscillator
113 Register
114 Register signal reception unit
115 Data transmission unit
115a, 133c Frequency divider
115b Parallel-serial conversion unit
115c, 133a Driver
115M First data transmission unit
115N, 315 Second data transmission unit
116 Clock signal transmission unit
117 Link unit
118, 119, 133b, 136, 137 Reproduction unit
133, 233 Data reception unit
133d Serial-parallel conversion unit
133M First data reception unit
133N Second data reception unit
134, 234 Signal generation unit
135 Register signal transmission unit
312 Switch
315c Driver

The invention claimed is:

1. A transmission device, comprising:
a control signal reception unit configured to receive a control signal input from an external device and including specific information; and
a control unit configured to control switching between first communication and second communication based on switching information, wherein
the switching information is in the specific information as necessary,
the switching information indicates switching between the first communication that executes host communication in a blanking period among one frame period and the second communication that executes the host communication in the blanking period and a data output period among the one frame period.

2. The transmission device according to claim 1, wherein the control unit is further configured to switch from the first communication to the second communication in a case where the one frame period has a high frame rate higher than a normal frame rate of a specific period.

3. The transmission device according to claim 2, wherein the control unit is further configured to switch to the normal frame rate after output of data at the high frame rate in a plurality of frames.

4. The transmission device according to claim 1, wherein the control unit is further configured to:
control transmission of first information to the external device when switching from the first communication to the second communication; and
control transmission of second information to the external device when switching from the second communication to the first communication.

5. The transmission device according to claim 4, wherein the first information includes standby sequential information and the second information includes training sequential information.

6. The transmission device according to claim 1, further comprising:
a first data transmission unit configured to transmit a first data signal input from a data generation unit to the external device by a specific wiring that transmits the control signal.

7. The transmission device according to claim 6, further comprising:
a second data transmission unit configured to transmit a second data signal input from the data generation unit to the external device by a wiring different from the specific wiring.

8. The transmission device according to claim 7, wherein the control unit is further configured to:
stop output of the second data signal from the second data transmission unit in a case where the one frame period has a normal frame rate of a specific period; and
output the second data signal from the second data transmission unit in a case where the one frame period has a high frame rate higher than the normal frame rate.

9. The transmission device according to claim 1, wherein a signal is bidirectionally communicated with the external device based on a standard of Scalable Low Voltage Signaling with Embedded Clock (SLVS-EC).

10. A reception device, comprising:
a control signal transmission unit configured to transmit, to an external device, a control signal that includes specific information including switching information as necessary, wherein the switching information indicates switching between first communication that executes host communication in a blanking period among one frame period and second communication that executes the host communication in the blanking period and a data output period among the one frame period; and
a control unit configured to control transmission of the control signal to the control signal transmission unit.

11. The reception device according to claim 10, wherein
in a case of determination that the external device transmits first information, the control signal transmission unit is further configured to transmit the control signal to the external device as necessary, and
in a case of determination that the external device transmits second information, the control signal transmission unit is further configured to stop the transmission of the control signal to the external device.

12. The reception device according to claim 11, wherein the first information includes standby sequential information and the second information includes training sequential information.

13. The reception device according to claim 11, further comprising:
a first data reception unit configured to receive a first data signal from the external device by a specific wiring that transmits the control signal.

14. The reception device according to claim 13, further comprising:
a second data reception unit configured to receive a second data signal output from the external device by a wiring different from the specific wiring.

15. The reception device according to claim 10, wherein a signal is bidirectionally communicated with the external device based on a standard of Scalable Low Voltage Signaling with Embedded Clock (SLVS-EC).

16. A transmission-reception system, comprising:
a transmission device configured to transmit a specific signal; and
a reception device configured to receive the specific signal from the transmission device, wherein
the transmission device includes:
a control signal reception unit configured to receive a control signal input from the reception device and including specific information; and
a first control unit configured to control switching between first communication and second communication based on switching information, wherein
the switching information is in the specific information as necessary, and
the switching information indicates switching between the first communication that executes host communication in a blanking period among one frame period and the second communication that executes the host communication in the blanking period and a data output period among the one frame period, and
the reception device includes:
a control signal transmission unit configured to transmit, to the transmission device, the control signal; and
a second control unit configured to control transmission of the control signal to the control signal transmission unit.

17. The transmission-reception system according to claim 16, wherein
each of the transmission device and the reception device bidirectionally communicate a signal based on a standard of Scalable Low Voltage Signaling with Embedded Clock (SLVS-EC).

* * * * *